(12) United States Patent
Zhang et al.

(10) Patent No.: US 11,713,807 B2
(45) Date of Patent: *Aug. 1, 2023

(54) METHOD AND SYSTEM FOR CONTROLLING A HYDROSTATIC DRIVE SYSTEM OF AN AGRICULTURAL VEHICLE

(71) Applicant: CNH Industrial America LLC, New Holland, PA (US)

(72) Inventors: Shusen Zhang, South Lyon, MI (US); Haibo Guo, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 321 days.

This patent is subject to a terminal disclaimer.

(21) Appl. No.: 17/038,314

(22) Filed: Sep. 30, 2020

(65) Prior Publication Data

US 2021/0018092 A1    Jan. 21, 2021

Related U.S. Application Data

(63) Continuation of application No. 15/878,551, filed on Jan. 24, 2018, now Pat. No. 10,808,839.

(51) Int. Cl.
*F16H 61/4157* (2010.01)
*B60W 10/196* (2012.01)
(Continued)

(52) U.S. Cl.
CPC ......... *F16H 61/4157* (2013.01); *B60W 10/06* (2013.01); *B60W 10/196* (2013.01);
(Continued)

(58) Field of Classification Search
CPC .. F16H 61/478; F16H 61/431; F16H 61/4157; F16H 61/421; B60W 10/06;
(Continued)

(56) References Cited

U.S. PATENT DOCUMENTS 3,863,988 A    2/1975  Bartels
3,933,053 A    1/1976  Bartels
(Continued)

FOREIGN PATENT DOCUMENTS

GB    2177765    1/1987
JP    2001304409    10/2001

OTHER PUBLICATIONS

Shaoyan et al., Research on Efficiency Optimization for Hydrostatic and Hydraulic Auxiliary Braking System of Tracked Vehicle, 2011, IEEE, p. 966-969 (Year: 2011).*
(Continued)

*Primary Examiner* — McDieunel Marc
(74) *Attorney, Agent, or Firm* — Peter Zacharias

(57) ABSTRACT

In ore aspect, a method is provided or braking a work vehicle including an engine and a hydrostatic drive system including a hydraulic pump configured to be rotationally driven by the engine and a hydraulic motor fluidly coupled with the hydraulic pump through a closed hydraulic loop of the hydrostatic drive system. The hydraulic pump may be configured to fluidly drive the hydraulic motor. The method may include receiving an operator request to reduce a ground speed of the work vehicle. The method may include monitoring a fluid temperature of a hydraulic fluid associated with the closed hydraulic loop and automatically controlling at least one of a pump displacement of the hydraulic pump or a motor displacement of the hydraulic motor based on the operator request and the monitored fluid temperature to adjust hydrostatic braking of the work vehicle and thereby reduce the ground speed of the work vehicle.

20 Claims, 8 Drawing Sheets

(51) Int. Cl.
  *B60W 30/18* (2012.01)
  *F16H 61/421* (2010.01)
  *F16H 61/431* (2010.01)
  *F16H 61/478* (2010.01)
  *B60W 10/06* (2006.01)

(52) U.S. Cl.
  CPC .......... *B60W 30/18109* (2013.01); *B60W 30/18136* (2013.01); *F16H 61/421* (2013.01); *F16H 61/431* (2013.01); *F16H 61/478* (2013.01); *B60W 2300/152* (2013.01); *B60W 2510/0638* (2013.01); *B60W 2510/107* (2013.01); *B60W 2510/1015* (2013.01); *B60W 2510/1075* (2013.01); *B60W 2710/0644* (2013.01); *B60W 2710/1038* (2013.01); *B60W 2710/1072* (2013.01); *B60W 2710/1077* (2013.01); *B60Y 2200/221* (2013.01)

(58) Field of Classification Search
  CPC ..... B60W 30/18109; B60W 30/18136; B60W 50/10; B60W 10/196; B60W 2510/1015; B60W 2710/1077; B60W 2510/1075; B60W 2710/1072; B60W 2510/0638; B60W 2710/0644; B60W 2510/107; B60W 2710/1038; B60W 2300/152; B60Y 2200/221
  See application file for complete search history.

(56) References Cited

U.S. PATENT DOCUMENTS

| | | | |
|---|---|---|---|
| 3,990,529 | A | 11/1976 | Bartels |
| 4,082,013 | A | 4/1978 | Dornfeld et al. |
| 5,406,793 | A | 4/1995 | Maruyama et al. |
| 5,542,251 | A | 8/1996 | Leibing et al. |
| 5,684,694 | A | 11/1997 | Ishino et al. |
| 5,995,895 | A | 11/1999 | Watt |
| 6,702,055 | B1 | 3/2004 | Pekkanen |
| 7,044,257 | B2 | 5/2006 | Kempf et al. |
| 7,613,560 | B2 | 11/2009 | Nishi et al. |
| 7,797,081 | B2 | 9/2010 | Demarco et al. |
| 8,051,916 | B2 * | 11/2011 | Bright ............ E02F 3/655 |
| | | | 180/242 |
| 8,261,544 | B2 | 9/2012 | Basana et al. |
| 9,423,026 | B2 | 8/2016 | Dix |
| 10,808,839 | B2 * | 10/2020 | Zhang ............ B60W 50/10 |
| 2002/0157365 | A1 | 10/2002 | Fackrell |
| 2002/0189218 | A1 | 12/2002 | Rosenbalm |
| 2004/0006957 | A1 | 1/2004 | Sheidler |
| 2015/0112558 | A1 | 4/2015 | Kuros |
| 2015/0176705 | A1 | 6/2015 | Dix |
| 2018/0258615 | A1 | 9/2018 | Xing |
| 2019/0226579 | A1 * | 7/2019 | Zhang ............ B60W 10/06 |
| 2019/0264419 | A1 | 8/2019 | Myers |

OTHER PUBLICATIONS

Nevala et al., Developing of the anti-slip control of hydrostatic power transmission for forest tractor and optimisation of the power of diesel engine, 1998, IEEE, p. 475-480 (Year: 1998).*
Chen et al., Regenerative braking study fora hydraulic hybrid vehicle, 2011, IEEE, p. 413-418 (Year: 2011).*
Yu et al., Research on the regenerative braking control strategy for secondary regulation hydrostatic transmission excavators, 2009, IEEE, p. 4600-4604 (Year: 2009).*
Nevala et al., Developing of the anti-slip control of hydrostatic power transmission for forest tractor and optimization of the power of diesel engine, 1998, IEEE, p. 475-480 (Year: 1998).
Shaoyan et al., Research of Efficiency Optimization for Hydrostatic and Hydraulic Auxiliary Braking System of Tracked Vehicle, 2011, IEEE, p. 966-969 (Year: 2011).
Li et al., Study on braking capacity of hydrostatic transmission vehicle, 2009, IEEE, p. 848-851 (Year: 2009).
Anacai et al., Research on the regenerative braking control strategy for secondary regulation hydrostatic transmission excavators, 2009, IEEE, p. 4600-4604 (Year: 2009).

* cited by examiner

METHOD AND SYSTEM FOR CONTROLLING A HYDROSTATIC DRIVE SYSTEM OF AN AGRICULTURAL VEHICLE

CROSS-REFERENCE TO RELATED APPLICATIONS

This application is a continuation of and claims the right of priority to U.S. patent application Ser. No. 15/878,551, filed Jan. 24, 2018, the disclosure of which is hereby incorporated by reference herein in its entirety for all purposes.

FIELD OF THE INVENTION

The present subject matter relates generally to hydrostatic drive systems for agricultural vehicles, and, more particularly, to a method and system for controlling a hydrostatic drive system to provide hydrostatic braking.

BACKGROUND OF THE INVENTION

Some agricultural work vehicles, such as combines and tractors, use hydrostatic transmissions to transmit power from the engines to the wheels. Hydrostatic drive systems often include a hydraulic pump that is driven by an engine (e.g., through a gearbox) and a hydraulic motor that drives the wheels (e.g., through a gearbox). A controller may be used to control the operation of at least one of the hydraulic pump or motor during operation of the work vehicle.

During braking, the kinetic energy of the work vehicle must be dissipated to stop the vehicle. For example, some of the kinetic energy may be dissipated using a conventional friction service brake (e.g., drum- or caliper-style brakes). Some hydrostatic transmissions may also provide the ability to dissipate kinetic energy through other means, including heat generated in the hydrostatic drive and/or engine braking.

Each of these energy dissipation modes, however, may potentially damage the work vehicle if not controlled properly. For example, engine braking may cause the engine to operate too fast. Additionally, heat generated in the hydrostatic drive may overheat the hydraulic fluid, which may damage the hydrostatic drive system.

Accordingly, a method for controlling a hydrostatic drive system to regulate engine braking and/or heat dissipation in a hydrostatic transmission would be welcomed in the technology.

BRIEF DESCRIPTION OF THE INVENTION

Aspects and advantages of the invention will be set forth in part in the following description, or may be obvious from the description, or may be learned through practice of the invention.

In general, the present subject matter is directed to a method for braking a work vehicle comprising an engine and a hydrostatic drive system. In some embodiments, the method may include receiving an operator request to reduce a ground speed of the vehicle and reducing the ground speed in response. During such deceleration, the kinetic energy of the work vehicle may be dissipated through various means. For example, the kinetic energy may be dissipated through hydrostatic engine braking and/or through a pressure relief flow through heat generated as hydraulic fluid flows through a pressure relief valve. The method may include controlling operating parameters of the hydrostatic drive system to actively balance the dissipation of the kinetic energy of the work vehicle between the various dissipation modes. For example, the method may include actively balancing a portion of the kinetic energy dissipated through engine braking and a portion that is dissipated through the pressure relief flow to optimize the performance of the system during braking. This may include adjusting various operating parameters of the system (e.g., pump displacement, motor displacement, etc.) based on various system inputs (e.g., engine speed, hydraulic fluid temperature, etc.).

In one aspect, the present subject matter is directed to a method for braking a work vehicle including an engine and a hydrostatic drive system. The hydrostatic drive system may include a hydraulic pump configured to be rotationally driven by the engine and a hydraulic motor fluidly coupled with the hydraulic pump through a closed hydraulic loop of the hydrostatic drive system. The hydraulic pump may be configured to fluidly drive the hydraulic motor. The method may include receiving, with one or more computing devices, an operator request to reduce a ground speed of the work vehicle. The method may include monitoring, with the one or more computing devices, a fluid temperature of a hydraulic fluid associated with the closed hydraulic loop. The method may include automatically controlling, with the one or more computing devices, at least one of a pump displacement of the hydraulic pump or a motor displacement of the hydraulic motor based on the operator request and the monitored fluid temperature to adjust hydrostatic braking of the work vehicle and thereby reduce the ground speed of the work vehicle.

In another aspect, the present subject matter is directed to a method for braking a work vehicle including an engine and a hydrostatic drive system. The hydrostatic drive system may include a hydraulic pump configured to be rotationally driven by the engine and a hydraulic motor fluidly coupled with the hydraulic pump through a closed hydraulic loop of the hydrostatic drive system. The hydraulic pump may be configured to fluidly drive the hydraulic motor. The method may include monitoring, with one or more computing devices, a fluid temperature of a hydraulic fluid associated with the closed hydraulic loop. The method may include automatically controlling, with one or more computing devices, at least one of a pump displacement of the hydraulic pump or a motor displacement of the hydraulic motor to provide hydrostatic braking for the work vehicle. The method may include automatically adjusting, with the one or more computing devices, a control valve to adjust a discharge flow of hydraulic fluid out of the closed hydraulic loop and a charge flow of hydraulic fluid into the closed hydraulic loop based on the monitored fluid temperature to reduce the fluid temperature of the hydraulic fluid.

In a further aspect, the present subject matter is directed to a method for braking a work vehicle comprising an engine and a hydrostatic drive system. The method may include receiving, with one or more computing devices, an operator request to reduce a ground speed of the work vehicle. The method may include automatically distributing, with the one or more computing devices, a kinetic energy of the work vehicle between an engine braking energy component and a heat dissipation energy component based on the received operator request by adjusting an operation of the hydrostatic drive system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
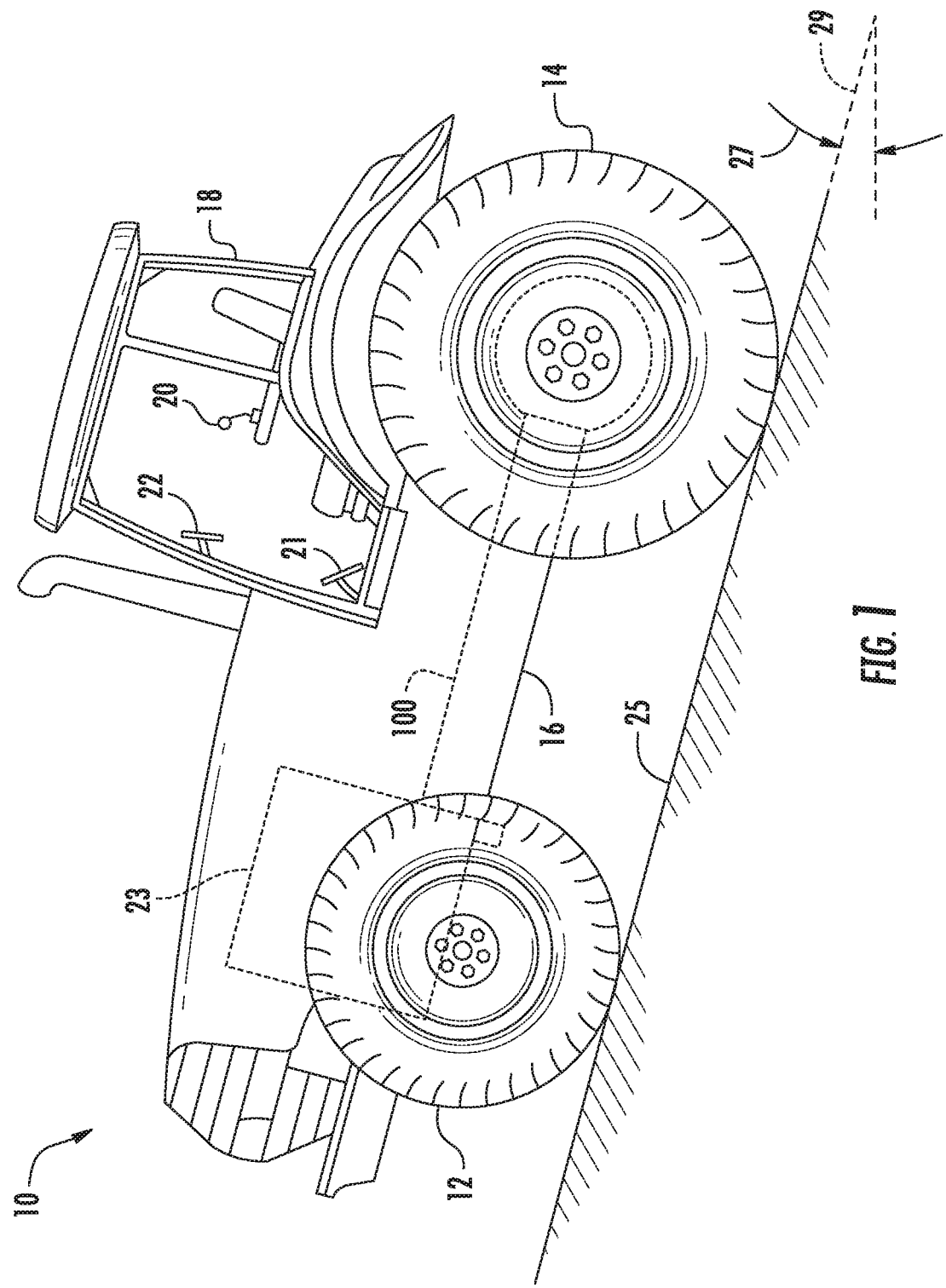
FIG. 1 illustrates a perspective view of one embodiment of a work vehicle having a hydrostatic drive system in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a method for braking a work vehicle comprising an engine and a hydrostatic drive system. In some embodiments, the hydrostatic drive system may include a hydraulic pump configured to be rotationally driven by the engine and a hydraulic motor fluidly coupled with the hydraulic pump through a closed hydraulic loop. The hydraulic pump may be configured to fluidly drive the hydraulic motor. The hydraulic motor may be configured to drive the wheels of the work vehicle, directly or through a gear train, to move the work vehicle across a ground surface. Thus, the hydrostatic drive system may generally act as a transmission between the engine and the wheels.

In some embodiments, the method may include reducing the ground speed of a work vehicle in response to receiving an operator request to do so. During deceleration, the kinetic energy of the work vehicle may be dissipated through various means. For example, the kinetic energy may be dissipated through hydrostatic engine braking and/or through a flow of hydraulic fluid through at least one pressure relief flow valve. The method may include balancing a portion of the kinetic energy dissipated through engine braking with a portion that is dissipated through the pressure relief flow to optimize the performance of the system during braking. This may include adjusting various operating parameters of the system (e.g., pump displacement, motor displacement, etc.) based on various system inputs (e.g., engine speed, hydraulic fluid temperature, etc.).

For example, in some embodiments, when the hydraulic oil is too hot, the energy dissipated through engine braking may be increased, and/or the portion dissipated through the pressure relief flow may be decreased. This may help reduce heat generation, and, thereby more effectively dissipate the kinetic energy while preventing damage to the hydrostatic drive system. Conversely, when the engine speed is too high, the energy dissipated through engine braking may be decreased, and/or the energy dissipated through the pressure relief flow may be increased. Such adjustments may maintain the speed of the engine in its operating range, thereby preventing damage caused by over-speeding the engine. Additionally, in some embodiments, the hydrostatic drive system may be configured to provide a form of active cooling of the hydraulic fluid, as discussed in greater detail below.

The hydrostatic drive system may provide engine braking by allowing the hydraulic motor to drive the hydraulic pump during deceleration such that kinetic energy of the work vehicle is dissipated by the engine via engine braking. For example, in response to receiving a deceleration request, a pump displacement of the hydraulic pump may be reduced and/or a motor displacement of the hydraulic motor may be increased. This may allow the system to effectively operate in reverse such that the hydraulic motor drives the hydraulic pump to dissipate a portion of the kinetic energy of the work vehicle through the engine.

As indicated above, the hydrostatic drive system may also include at least one pressure relief valve that dissipates energy through heat. When the pressure relief valve is open, hydraulic fluid may flow through the pressure relief valve and be discharged from the closed hydraulic loop of the hydrostatic drive system. Such flow may convert a portion of the kinetic energy of the vehicle into heat, thereby dissipating the energy. According to aspects of the present disclosure, the pump displacement and/or the motor displacement may be adjusted during deceleration of the work vehicle to optimize dissipation of the kinetic energy of the work vehicle.

In some embodiments, according to aspects of the present disclosure, a hydrostatic drive system may be configured to provide a form of active cooling. For example, the hydrostatic drive system may include a control valve and charge pump to selectively facilitate cooling of the hydraulic fluid during a braking operation. The control valve may be selectively opened when the hydraulic fluid temperature exceeds a predetermined temperature threshold. This may cause the charge pump to supply an increased flow of cooling hydraulic fluid from a reservoir into the closed hydraulic loop, thus reducing the temperature of the hydraulic fluid. Such cooling may further optimize the performance of the hydrostatic drive system when decelerating the work vehicle.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle that employs a hydrostatic transmission, such as various other agricultural vehicles (e.g., combine, sprayer, etc.), earth-moving vehicles, loaders and/or various other off-road vehicles.

As shown in FIG. 1, the work vehicle 10 includes front wheels 12, rear wheels 14, and a chassis 16 coupled to and supported by the wheels 12, 14. An operator's cab 18 may be supported by a portion of the chassis 16 and may house various control or input devices 20, 21, 22 (e.g., levers, pedals, control panels, buttons and/or the like) for permitting an operator to control the operation of the work vehicle 10. For instance, as shown in FIG. 1, the work vehicle 10 may include a multi-functional handle 20. In addition, the work vehicle 10 may include a display panel 22 for displaying message windows and/or alerts to the operator and/or for allowing the operator to interface with the vehicle's controller. For instance, in one embodiment, the display panel 22 may include a touch screen and/or associated buttons or other input devices that allow the operator to provide user inputs to the controller. Moreover, the work vehicle 10 may include an engine 23 and a hydrostatic drive system 100 mounted on the chassis 16 and configured to rotate the front wheels 12 and/or rear wheels 14 to move the work vehicle 10 relative to a ground surface 25. In some embodiments, the ground surface 25, and thus the work vehicle 10, may be oriented at a grade angle 27 with respect to a horizontal direction 29.

Figure 2:
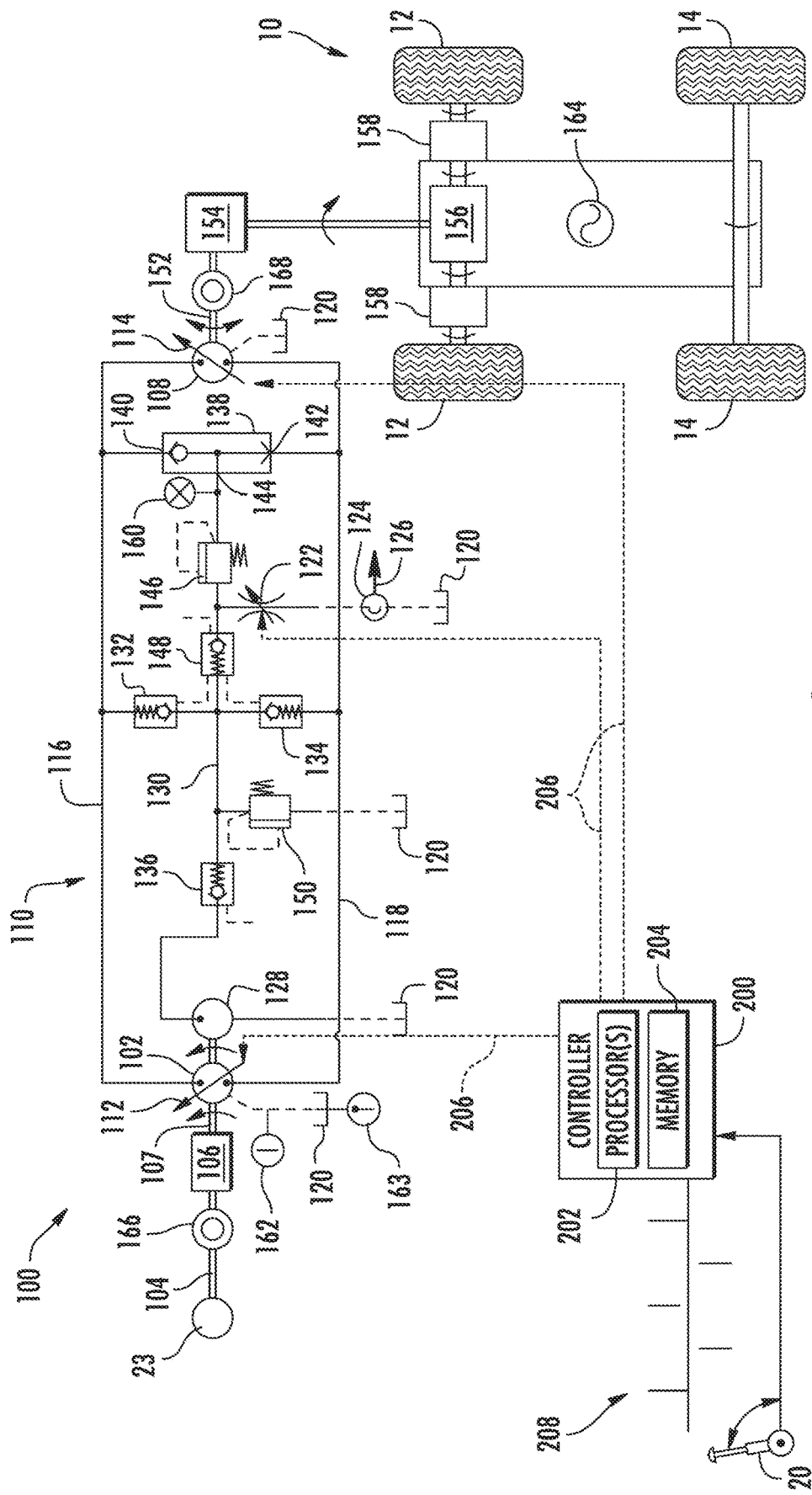
FIG. 2 illustrates a schematic view of a hydraulic drive system in accordance with aspects of the present disclosure.

FIG. 2 illustrates a schematic view of one embodiment of a hydrostatic drive system 100 in accordance with aspects of the present disclosure. In general, the hydraulic drive system 100 will be described with reference to the work vehicle 10 shown in FIG. 1. However, it should be appreciated that the hydraulic drive system 100 may generally be utilized with any suitable work vehicle having any suitable vehicle configuration.

As shown, the hydrostatic drive system 100 may include a hydraulic pump 102, with the engine 23 of the work vehicle 10 being configured to drive the hydraulic pump 102. For example, the engine 23 may have an output shaft 104 configured to drive an engine gearbox 106. The engine gearbox 106 may, in turn, be configured to drive the hydraulic pump 102 via an input shaft 107 of the hydraulic pump 102. The hydrostatic drive system 100 may also include a hydraulic motor 108 fluidly connected with the hydraulic pump 102 through a closed hydraulic loop 110 of the hydrostatic drive system 100 such that the hydraulic motor 108 may be configured to fluidly drive by the hydraulic pump 102. The hydraulic pump 102 may include a plurality of pistons and a variable angle pump swash plate (represented by diagonal arrow 112 in FIG. 2) that is configured to adjust the pump displacement for the hydraulic pump 102. Similarly, the hydraulic motor 108 may include a plurality of pistons and/or a variable angle motor swash plate (represented by diagonal arrow 114 in FIG. 2) configured to adjust the motor displacement for the hydraulic motor 108.

The closed hydraulic loop 110 may fluidly connect the hydraulic pump 102 with the hydraulic motor 108. For example, the closed hydraulic loop 110 may include a first line 116 and a second line 118. When driving the work vehicle 10 in a forward direction, the hydraulic pump 102 may output a high pressure flow of hydraulic fluid into the first line 116. In turn, the hydraulic fluid may flow through the first line 167 and drive the hydraulic motor 108 to move the vehicle 10 forward. The hydraulic fluid flows through the hydraulic motor 108, through the second line 118 and returns back to a low pressure supply side of the hydraulic pump 102. When driving in reverse, the hydraulic pump 102 outputs high pressure to the second line 118, and the hydraulic fluid returns back to the hydraulic pump 102 through the first line 116. In either direction, the hydraulic pump 102 drives the hydraulic motor 108 to drive the work vehicle 10. To decelerate the work vehicle 10, however, the system 100 may effectively operate in reverse and provide engine braking. The hydraulic motor 108 may drive the hydraulic pump 102 such that kinetic energy of the work vehicle may be dissipated by the engine 23 through engine braking. According to aspects of the present disclosure, the pump displacement of the hydraulic pump 102 and/or the motor displacement of the hydraulic motor 108 may be adjusted during deceleration to optimize performance of the system 100 (e.g., engine braking and/or pressure relief flow, as explained in greater detail below).

In some embodiments, the hydrostatic drive system 100 may also be configured to actively cool the hydraulic fluid. For example, the hydrostatic drive system 100 may include a control valve 122 (e.g., an electronically controllable valve) configured to control a discharge flow of hydraulic fluid out of the closed hydraulic loop 110. The discharge flow may flow from the control valve 122 to the reservoir 120 (illustrated in multiple locations in FIG. 2 for simplicity). In some embodiments, a heat exchanger 124 may be fluidly connected between the control valve 122 and the reservoir 120 to provide additional cooling (heat flow out of the heat exchanger 124 is illustrated by a horizontal arrow 126 in FIG. 2). The hydraulic drive system 100 may also include a charge pump 128 configured to provide a charge flow of cooling hydraulic fluid. For example, the charge pump 128 may be driven by the engine shaft 104 and may be configured to pump hydraulic fluid from the reservoir 120 into a charge supply line 130 of the hydrostatic drive system 100 to replenish the closed hydraulic loop 110 when fluid is discharged through the control valve 122, through pressure relief valves, and/or to compensate for any system leakage, as explained in greater detail below.

The charge pump 128 may supply a flow of hydraulic fluid to the first line 116 and/or second line 118 through the charge supply line 130. For example, a first check valve 132 may permit hydraulic fluid to flow from the charge supply line 130 to the first line 116 when a pressure difference between the charge supply line 130 and the first line 116 exceeds a first predetermined pressure threshold. A second check valve 134 may permit hydraulic fluid to flow from the charge supply line 130 to the second line 118 when a pressure difference between the charge supply line 130 and the second line 118 exceeds a second predetermined pressure threshold. Thus, the first and second check valves 132, 134 may permit hydraulic fluid to flow from the charge supply line 130 to the first line 116 and/or second line 118 depending on the relative pressures in the lines 116, 118, 130 such that the charge pump 128 may replenish the volume of hydraulic fluid in the first line 116 and second line 118.

In some embodiments, a third check valve 136 may be fluidly connected with an outlet of the charge pump 128, for example, to prevent backflow through the charge pump 128. The third check valve 136 may similarly be configured to permit a one-way flow of the hydraulic fluid from the charge pump 128 into the charge line 130 when the pressure difference across the third check valve 136 exceeds a third predetermined pressure threshold.

In some embodiments, a shutter valve 138 may have a first input 140 fluidly connected with the first line 116 and a second input 142 fluidly connected with the second line 118. The shutter valve 138 may also include an outlet 144, and the shutter valve 138 may be configured to selectively permit hydraulic fluid to flow from either the first input 140 or the second input 142 to the outlet 144. For example, the shutter valve 138 may permit flow from the first input 140 to the outlet 144 while blocking flow from the second input 142 to the outlet 144 when the fluid pressure at the first input 140 is greater than the fluid pressure at the second input 142. Similarly, the shutter valve 138 may permit flow from the second input 142 to the outlet 144 and block flow from the first input 140 to the outlet 144 when the fluid pressure at the second input 142 is greater than the fluid pressure at the first input 140.

In some embodiments, the hydrostatic drive system 100 may be configured to provide a pressure relief flow based on the hydraulic pressure(s) within the closed hydraulic loop 110. The pressure relief flow may dissipate a portion of the kinetic energy of the work vehicle 10 through heat, and prevent the pressure in the closed hydraulic loop 110 from exceeding a safe, predetermined threshold. For example, the hydrostatic drive system 100 may include a first pressure relief valve 146 having an inlet fluidly connected with the outlet 144 of the shutter valve 138. The first pressure relief valve 146 may be configured to permit flow therethrough when a pressure differential across the first pressure relief valve 146 exceeds a first predetermined system relief pressure. The first pressure relief valve 146 may have an outlet fluidly connected with at least one of the control valve 122 or a fourth check valve 148. The fourth check valve 148 may be configured to permit a one-way flow from the outlet of the first pressure relief valve 146 to the charge supply line 130 when the difference across the fourth check valve 148 exceeds a fourth predetermined pressure threshold. In some embodiments, a second pressure relief valve 150 may be fluidly connected between the charge supply line 130 and the reservoir 120. The second pressure relief valve 150 may be configured to permit a flow from the charge supply line 130 to the reservoir 120 when a pressure differential across the second pressure relief valve 150 exceeds a second predetermined system relief pressure. Thus, the pressure relief valves 146, 150 may be configured to permit flow from the closed hydraulic loop 110 (the first line 116 and/or second line 118) to the reservoir 120 when the pressure in the hydraulic loop 110 is too high.

The hydraulic motor 108 may be configured to drive rotation of the wheels 12, 14 of the work vehicle 10, for example through a motor gearbox 154 and/or a differential 156. The hydraulic motor 108 have an output shaft 152 configured to drive rotation of the wheels 12, 14 of the work vehicle 10. For example, the output shaft 152 of the hydraulic motor 108 may drive the motor gearbox 154, and the motor gearbox 154 may drive the differential 156. The differential 156 may be coupled with a pair of final drives 158, and each final drive 158 may be configured to drive a respective wheel 12, 14 of the work vehicle 10.

In some embodiments, the hydrostatic drive system 100 may include a plurality of sensors. For example, the hydrostatic drive system 100 may include a pressure sensor 160 fluidly connected with the outlet 144 of the shutter valve 138. In other embodiments, the pressure sensor 160 may be fluidly connected directly with the first line 116, for example. In other embodiments, the hydrostatic drive system 100 may include additional pressure sensors configured to measure the hydraulic pressure of the fluid at any suitable location in the closed hydraulic loop 110 and/or charge supply line 130.

In some embodiments, the hydrostatic drive system 100 may include at least one temperature sensor configured to measure a temperature of the hydraulic fluid in the closed hydraulic loop 110. For example, a temperature sensor 162 may be fluidly connected with a drain port of the hydraulic pump 102, (often referred to as "case drain"), that allows excess hydraulic fluid to flow to the reservoir 120. The fluid flowing out of the drain port of the hydraulic pump 102 may be substantially at the same temperature as the hydraulic fluid in the closed hydraulic loop 110. Thus, the temperature sensor 162 may be effectively configured to sense the temperature of the hydraulic fluid in the closed hydraulic loop 110.

In other embodiments, the hydrostatic drive system 100 may include at least one temperature sensor directly fluidly connected with the first line 116 or second line 118 to directly sense the temperature of the hydraulic fluid in these lines 116, 118. The hydrostatic drive system 100 may include temperature sensors having any other suitable location within the hydrostatic drive system 110 (e.g., connected with the charge supply line 130 or any other suitable line). Additionally, in some embodiments, a reservoir temperature sensor 163 may be configured to sense the temperature of the hydraulic fluid in the reservoir 120.

In some embodiments, the hydrostatic drive system 100 may include various sensors configured to sense the position or orientation of the work vehicle 10. For example, an inclinometer 164 may be coupled with the work vehicle 10 such that the grade angle 27 (illustrated in FIG. 1) of the work vehicle 10 with respect to the horizontal direction 29 may be sensed. According to aspects of the present disclosure, the measured grade angle 27 may also be used to control aspects of the operation of the hydrostatic drive system 100 during braking.

In some embodiments, the hydrostatic drive system 100 may include at least one speed sensor configured to measure or sense rotation speeds of various components of the hydrostatic drive system 100. For example, an engine speed sensor 166 may be configured to sense an engine speed of an output shaft 104 of the engine 23. A motor gearbox speed sensor 168 may be configured to sense a speed of the output shaft 152 of the hydraulic motor 108 that drives the gearbox 154. This rotational speed may be used to determine the ground speed of the work vehicle 10. For example, in some embodiments, gearbox 154 may have multiple gears with associated gear ratios (e.g., a multiple range gearbox). A gearbox ratio sensor may be configured to sense the current gear of the gearbox 154 such that the ground speed of the work vehicle 10 may be calculated based on the rotational speed of the input shaft of the motor gearbox 154 and the current gear ratio. Additionally, in some embodiments, the motor gearbox speed sensor 168 (or a separate sensor) may be configured to sense a rotational speed of an output shaft of the hydraulic motor 108.

In some embodiments, the hydrostatic drive system 100 may generally include a controller 200 installed on and/or otherwise provided in operative association with the work vehicle 10. In general, the controller 200 may correspond to any suitable processor-based device(s), such as a computing device or any combination of computing devices. Thus, in several embodiments, the controller 200 may include one or more processor(s) 202 and associated memory device(s) 204 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, electronic control unit (ECU), and other programmable circuits. Additionally, the memory device(s) may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s) configure the controller to perform various computer-implemented functions, such as those described below and/or one or more aspects of the methods described below with reference to FIGS. 3 and 4.

In some embodiments, the controller 200 may be configured to automatically control a pump displacement of the hydraulic pump 102 and/or a motor displacement of the hydraulic motor 108. For example, the controller 200 may be communicatively coupled through one or more communicative links 206 with valves and/or actuators configured to adjust respective angles of the motor swash plate 114 and/or pump swash plate 112. Adjusting the angle(s) of the swash plate(s) 112, 114 may provide adjustment of the pump displacement and/or motor displacement, thereby adjusting a transmission ratio of the hydraulic drive system 100. The controller 202 may be configured to receive signals 208 from the various sensors described herein and decode and/or interpret the signals 208 to sense and/or monitor the various parameters described herein.

In some embodiments, the controller 200 may be configured to regulate engine braking of the hydrostatic drive system 100 based on an operator braking request and various system conditions (e.g., engine speed, hydraulic fluid temperature, etc.). Engine braking may reduce the heat generated in the system 100 and distribute the kinetic energy of the work vehicle 10 between engine braking and hydraulic relief. In some embodiments, the controller 200 may be configured to provide the maximum amount of engine braking possible without over-speeding the engine 23. Thus, when the engine speed is too high, the controller 200 may adjust (e.g., reduce) the pump displacement and/or the motor displacement such that the amount of engine braking is reduced to prevent the over-speeding.

In some embodiments, the controller 200 may also be configured to prevent over heating of the hydraulic fluid during braking. For example, the controller 200 may calculate a composite scaling factor based, at least in part, on the hydraulic fluid temperature. The composite scaling factor may be reduced when the hydraulic fluid temperature exceeds a predetermined temperature threshold. In response, the controller 200 may adjust the operation of the system 100 to prevent overheating of the hydraulic fluid. For example, the controller 200 may reduce the pump displacement and/or motor displacement as a result of the reduction in the composite scaling factor, as explained in greater detail below. In some embodiments, the controller 200 may also be configured to regulate engine braking of the hydrostatic drive system 100 to protect the engine 23 from damage as a result of over-speeding.

In some embodiments, the controller 200 may be configured to cool the hydraulic fluid by allowing a flow of hydraulic fluid out of the closed hydraulic loop 110, cooling the hydraulic fluid, and then pumping the hydraulic fluid back into the closed hydraulic loop 100. For example, in some embodiments, the pressure relief valves 146, 150, and the fourth check valve 148 may automatically provide a flow of hydraulic fluid from the closed hydraulic loop 110 to the reservoir 120 based on the fluid pressure in the closed hydraulic loop 110 (e.g., when the pressure is too great). More specifically, when the hydraulic pressures in the first line 116 or second line 118 exceed the first predetermined relief valve pressure or second predetermined relief valve pressure, hydraulic fluid may flow from the first line 116 or second line 118 through the shutter valve 138, through the first pressure relief valve 146, through the fourth check valve 148, and through the second pressure relief valve 150 to the reservoir 120. In response, the charge pump 128 may replenish the closed hydraulic loop 110 with hydraulic fluid at a relatively cooler temperature. The charge pump 128 may provide an increased flow of hydraulic fluid from the reservoir 120 to the charge supply line 130 and ultimately to the closed hydraulic loop 110 via the first check valve 132 and/or second check valve 134. This relatively cooler fluid may help cool the hydraulic fluid in the closed hydraulic loop 110. Thus, some cooling may be automatically provided when the fluid pressure in the closed hydraulic loop 110 exceeds the first predetermined relief valve pressure and second predetermined relief valve pressure.

In addition, in some embodiments, the controller 200 may be configured to adjust the control valve 122 to provide additional cooling based on the monitored fluid temperature of the hydraulic fluid (e.g., fluid that flows out of the drain port of the hydraulic pump 102 as measured by temperature sensor 162). For example, the controller 200 may be configured to provide a separate flow of hydraulic fluid from the closed hydraulic loop 110 to the reservoir 120, which may trigger additional cooling fluid to be pumped into the hydraulic loop 110 via the charge pump 128. The controller 200 may be configured to adjust the control valve 122 based on the fluid temperature (e.g., when the fluid temperature is too hot) to allow hydraulic fluid to flow through the control valve 122, through the heat exchanger 124, and into the reservoir 122. More specifically, hydraulic fluid may flow from the closed hydraulic loop 110 (e.g., from the first line 116 or second line 118) through the shutter valve 138, through the first pressure relief valve 146, and through the control valve 122 to the reservoir 120. The charge pump 128 may replenish the closed hydraulic loop with an increased flow of relatively cooler hydraulic fluid from the reservoir 120. Thus, the controller 200 may be configured to provide a form of active cooling of the hydraulic fluid based on the monitored fluid temperature of the hydraulic fluid.

In some embodiments, the engine-braking regulation described above may be incorporated with the active cooling function described above. For example, the active cooling based on the monitored fluid temperature described above may help prevent overheating of the hydraulic fluid. As a result, the kinetic energy of the work vehicle 10 may be absorbed by both the pressure relief system (e.g., heat generated by flow through the pressure relief valves 146, 150) and engine braking. This combination may allow the hydrostatic drive system 100 to provide greater engine braking capabilities and/or pressure relief energy dissipation than otherwise, thereby further optimizing the performance of the system 100.

Figure 3:
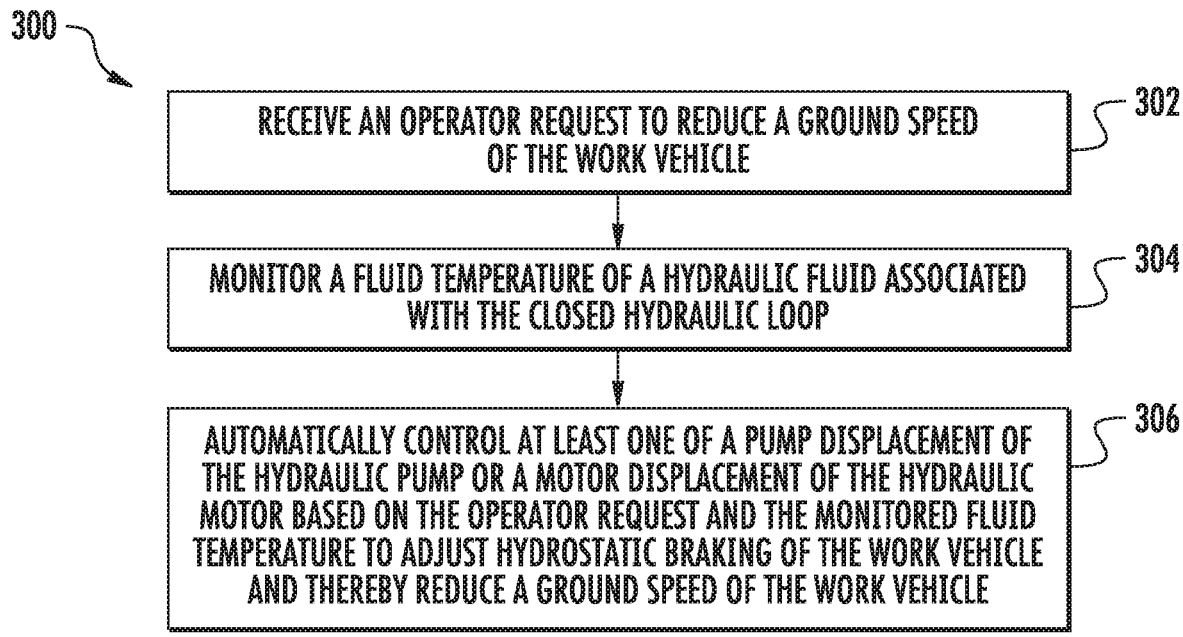
FIG. 3 illustrates one embodiment of one method for braking a work vehicle comprising an engine and a hydrostatic drive system in accordance with aspects of the present disclosure.

FIG. 3 illustrates one embodiment of a method 300 for braking a work vehicle 10 including an engine 23 and a hydrostatic drive system 100 in accordance with aspects of the present disclosure. In general, the method 300 will be described with reference to the work vehicle 10 and associated hydrostatic drive system 100 described above with reference to FIGS. 1 and 2. However, it should be appreciated by those of ordinary skill in the art that the disclosed method 300 may generally be utilized with any other suitable vehicle or transmission configuration and/or any other suitable system configuration. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (302), the method 300 may include receiving an operator request to reduce a ground speed of the work vehicle 10. For example, the operator may indicate a reduction in the requested speed using the multi-functional handle 20 described above with reference to FIG. 2. The controller 200 may compare the requested speed and a current, measured speed of the work vehicle 10 (e.g., as measured and calculated based on the motor gearbox speed sensor 168 and/or gearbox ratio sensor) to determine that the operator is requesting a ground speed reduction.

At (304), the method 300 may include monitoring a fluid temperature of a hydraulic fluid associated with the closed hydraulic loop 110. For example, in some embodiments, the controller 200 may monitor the temperature of the hydraulic fluid flowing out of the drain port of the hydraulic pump 102 using the temperature sensor 162. In other embodiments, the controller 200 may be configured to directly monitor the temperature of the hydraulic fluid in the first line 116 and/or second line 118 using temperature sensors fluidly coupled with the first line 116 or second line 118.

The method 300 may include, at (306), automatically controlling at least one of a pump displacement of the hydraulic pump 102 or a motor displacement of the hydraulic motor 108 based on the operator request and the monitored fluid temperature to adjust hydrostatic braking of the work vehicle 10 and thereby reduce a ground speed of the work vehicle 10. When the work vehicle 10 is decelerating, the hydrostatic drive system 100 may work in reverse to provide engine braking such that the engine 23 is driven by the wheels 12, 14 of the work vehicle 10. More specifically, the hydraulic pump 102 may be driven by the hydraulic motor 108, and the hydraulic pump 102 may, in turn, drive the engine 23. The engine 23 may provide a resistance to the hydraulic motor 108, and thus, during braking, the hydrostatic drive system 100 may provide engine braking to dissipate a portion of the kinetic energy of work vehicle 10 through the engine 23. For example, the controller 200 may adjust the angle(s) of the pump swash plate 112 and/or motor swash plate 144 to adjust the pump displacement and/or motor displacement. For instance, in response to receiving the operator request to decelerate the work vehicle 10, the controller 200 may reduce the pump displacement and/or increase the motor displacement. The controller 200 may adjust the pump displacement and motor displacement to balance the dissipation of energy between engine braking and pressure relief flow.

When the pressure in the hydraulic lines 116, 118 is sufficient to open the pressure relief valves 146, 150, a portion of the kinetic energy of the work vehicle 10 may be converted into heat as the hydraulic fluid passes through the pressure relief valves 146, 150. Such heat may be dissipated to the ambient environment and/or increase the fluid temperature of the hydraulic fluid. Kinetic energy may also be converted into heat as the hydraulic fluid passes through any other constriction in the system 100, including for example, the check valves 132, 134, 136, 148, and/or the control valve 122.

The pump displacement and/or motor displacement may be controlled based on the operator input, as explained above. In some embodiments, the pump displacement and/or the motor displacement may also be controlled based on various additional parameters, including, for example, engine speed, hydraulic motor speed, pump speed, hydraulic fluid pressure (e.g., in the first line and/or second line), vehicle ground speed, ground slope, and/or hydraulic temperature of hydraulic fluid in the reservoir and/or closed hydraulic loop. For example, a composite scaling factor may be calculated based on some or all of the above parameters, and the pump displacement and/or the motor displacement may be controlled based on the composite scaling factor.

In some embodiments, the controller 200 may be configured to adjust the pump displacement and/or motor displacement to provide a maximum amount of engine braking possible without causing the engine to operate at too high of an engine speed. For example, the controller 200 may be configured to sense an engine speed of the engine 23 and compare the engine speed with a predetermined engine speed threshold. When the engine speed threshold exceeds the predetermined engine speed threshold, the controller 200 may adjust (e.g., reduce) at least one of the pump displacement or the motor displacement.

Figure 4:
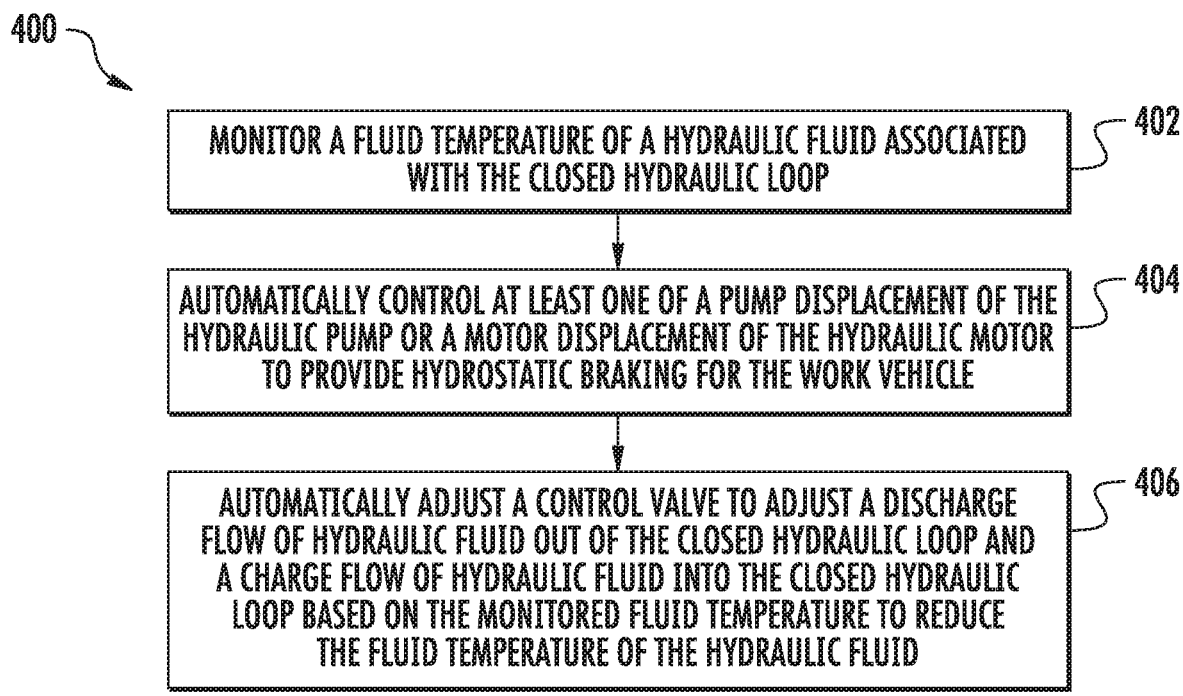
FIG. 4 illustrates an embodiment of another method for braking a work vehicle including an engine and a hydrostatic drive system in accordance with aspects of the present disclosure.

FIG. 4 illustrates an embodiment of another method 400 for braking a work vehicle including an engine and a hydrostatic drive system in accordance with aspects of the present disclosure. In general, the method 400 will be described with reference to the work vehicle 10 and associated hydrostatic drive system 100 described above with reference to FIGS. 1 and 2. However, it should be appreciated by those of ordinary skill in the art that the disclosed methods may generally be utilized with any other suitable vehicle or transmission configuration and/or any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

In some embodiments, the method 400 may include, at (402), monitoring a fluid temperature of a hydraulic fluid associated with the closed hydraulic loop 110 of the system 100. For example, the method 400 may include monitoring the fluid temperature of the hydraulic fluid flowing out of the drain port of the hydraulic pump 102 using the temperature sensor 162. In other embodiments, the temperature of the hydraulic fluid may be monitored at any other suitable location in the hydraulic drive system 100.

The method may include, at (404), automatically controlling at least one of a pump displacement of the hydraulic pump 102 or a motor displacement of the hydraulic motor 108 to provide hydrostatic braking for the work vehicle 10. For example, the controller 200 may receive a requested vehicle speed (e.g., from the multi-functional handle 20) and compare the requested vehicle speed with a measured vehicle speed (e.g., calculated based on signals received from the motor gearbox speed sensor 168 and/or gearbox ratio sensor). The controller 200 may adjust the angle(s) of the pump swash plate 112 and/or motor swash plate 114 thereby adjusting the pump displacement and/or motor displacement to provide engine braking and decelerate the work vehicle 10 as requested. For instance, in response to receiving the operator request to decelerate the work vehicle 10, the controller 200 may reduce the pump displacement and/or increase the motor displacement. The controller 200 may also adjust the pump displacement and/or motor displacement based on at least one of engine speed, hydraulic motor speed, pump speed, hydraulic fluid pressure (e.g., in the first line 116 and/or second line 118), hydraulic fluid temperature, vehicle ground speed, vehicle speed error between a requested speed (e.g., as indicated by the multi-functional handle 20) and a measured vehicle ground speed, ground slope, temperature of hydraulic fluid at the pump outlet as measured by temperature sensor 162, and/or temperature of hydraulic fluid in the reservoir 120 as measured by the reservoir temperature sensor 163.

Additionally, the method 400 may include, at (406), automatically adjusting a control valve 122 to adjust a discharge flow of hydraulic fluid out of the closed hydraulic loop 110 and a charge flow of hydraulic fluid into the closed hydraulic loop 110 based on the monitored fluid temperature to reduce the fluid temperature of the hydraulic fluid. For example, the controller 200 may be configured to open the control valve 122 (e.g., adjust the control valve 122 towards an open position). The charge pump 128 may replenish the system closed hydraulic loop 110 with additional hydraulic fluid from the reservoir 120 via the charge supply line 130. The hydraulic fluid in the reservoir 120 may generally be at a cooler temperature than the hydraulic fluid in the closed hydraulic loop 110, and thus, this may reduce the fluid temperature of the hydraulic fluid in the closed hydraulic loop 110. For example, in some embodiments, the method 400 may include, when the fluid temperature exceeds the predetermined temperature threshold, opening the control valve 122 to increase a discharge flow of hydraulic fluid out of the closed hydraulic loop 110.

Figure 5:
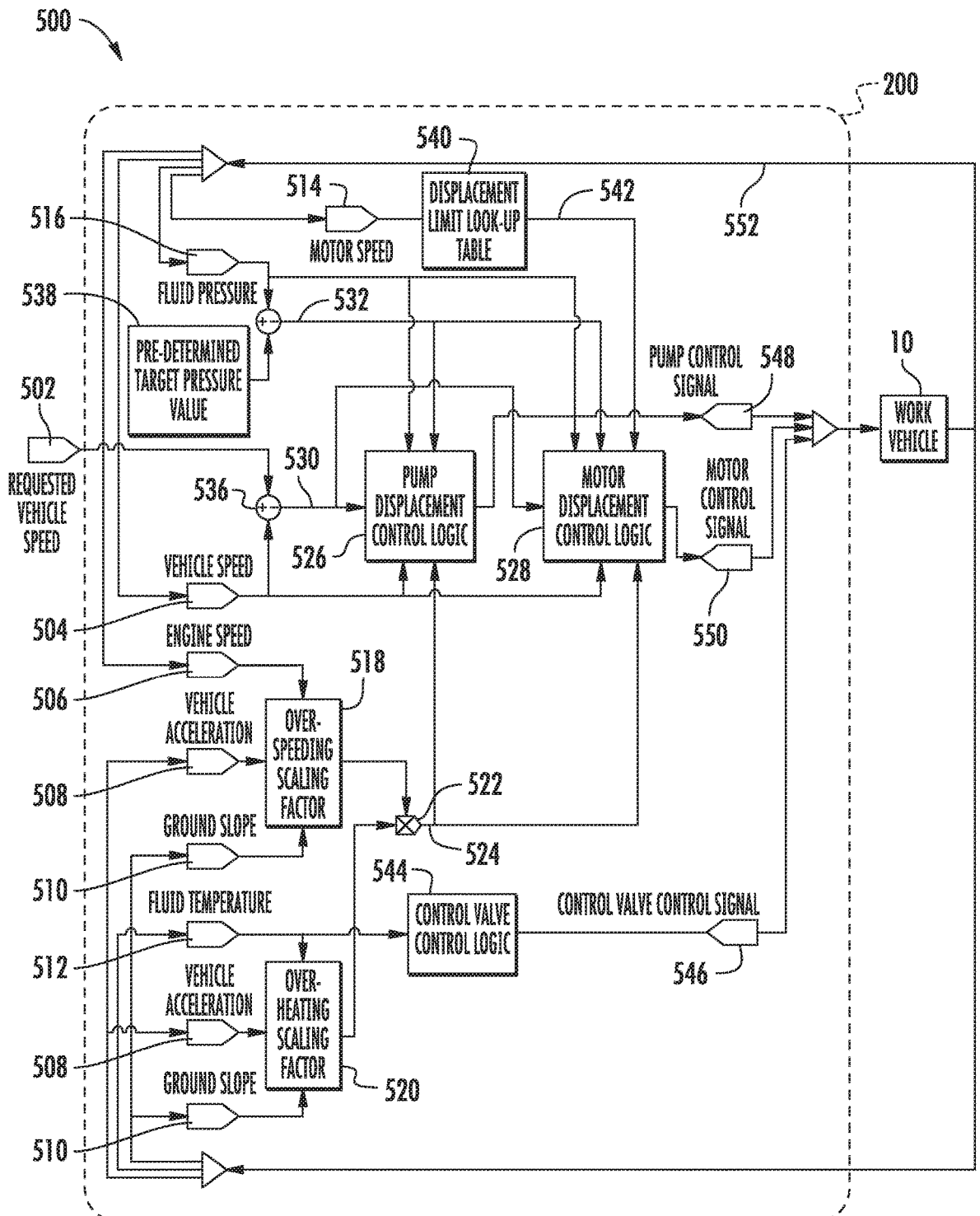
FIG. 5 illustrates a schematic view of one embodiment of a system for braking a work vehicle including an engine and a hydrostatic drive system in accordance with aspect of the present disclosure.

In accordance with aspects of the present disclosure, FIG. 5 illustrates a schematic view of one embodiment of a system 500 for braking a work vehicle 10 including an engine 23 and a hydrostatic drive system 100. In some embodiments, the system 500 may configured as a feedback controller that senses or monitors at least one operating parameter and controls at least one component of the hydrostatic drive system 100 and/or the work vehicle 10. For example, the controller 200 may control the operation of at least one of the hydraulic pump 102, hydraulic motor 108, control valve 122, and/or engine 23 according to the operations described below with reference to the system 500.

In some embodiments, the controller 200 may sense and/or calculate a plurality of operating parameters. For example, the controller 200 may sense a requested vehicle speed 502, for example, from the multi-functional handle 20. The system 500 may also sense, monitor, or calculate a vehicle speed 504 of the work vehicle 10, engine speed 506 (e.g., sensed by the engine speed sensor 166), vehicle acceleration 508 (e.g., monitored directly using an accelerometer and/or calculated from the sensed vehicle speed 504), ground slope 510 (e.g., sensed by the inclinometer 164), hydraulic fluid temperature 512 (e.g., sensed by the temperature sensor 162), hydraulic motor speed 514, and hydraulic fluid pressure 516 (e.g., sensed by the pressure sensor 160).

In some embodiments, the controller 200 may be configured to calculate an over-speeding scaling factor 518 and/or an over-heating scaling factor 520 based on one or more operating parameters. For example, the over-speeding scaling factor 518 may be calculated based on at least one of the engine speed 506, vehicle acceleration 508 and/or the ground slope 510. The over-speeding scaling factor 518 may be calculated based on a set of rules, using mathematical operators, by referencing a look-up table based on the operating parameters, or the like. Similarly, the over-heating scaling factor 520 may be calculated based on at least one of the fluid temperature of the hydraulic fluid, vehicle acceleration 508, or ground slope 510 (e.g., as measured by the inclinometer 164).

In some embodiments, the over-speeding scaling factor 518 and/or over-heating scaling factor 520 may be used to control the motor displacement and/or pump displacement to help prevent the engine 23 from exceeding a predetermined engine speed threshold and/or prevent the hydraulic fluid from exceeding the predetermined fluid temperature threshold. For example, as discussed above, during braking, the kinetic energy of the work vehicle 10 may be dissipated through engine braking and/or friction heat energy associated with the hydraulic fluid (as well as through other means). The over-speeding and/or over-heating scaling factors 518, 520 may be calculated to optimize the dissipation of the kinetic energy of the work vehicle 10, for example. A decrease in the over-speeding scaling factor 518 may cause the system 100 to adjust various operating parameters (e.g., the pump and/or motor displacement) to prevent the engine 23 from over speeding. For example, when the over-speeding scaling factor 518 decreases, the system 100 may decrease the engine braking provided by the system 500 by decreasing the pump displacement and/or motor displacement. Similarly, a decrease in the over-speeding scaling factor 518 may cause the system 100 to adjust various operating parameters (e.g., the pump and/or motor displacement) to prevent the hydraulic fluid in the closed hydraulic loop 110 from overheating. For example, when the over-heating scaling factor 518 decreases, the system 100 may increase the engine braking provided by the system 500 by increasing the pump displacement and/or motor displacement.

In some embodiments, the over-speeding scaling factor 518 and over-heating scaling factor 520 may be mathematically combined, at combination block 522, to produce a composite scaling factor 524 that is used to control the operating parameters of the system 500 to achieve the above-described objectives. For example, a decrease in the over-speeding scaling factor 518 may cause the composite scaling factor 524 to decrease (resulting in less engine braking), while a decrease in the over-heating scaling factor 518 may cause the composite scaling factor 524 to increase (resulting in more engine braking and thus less energy being converted to heat).

In some embodiments, a pump displacement control logic 526 and a motor displacement control logic 528 may be configured to control the pump displacement and motor displacement based on at least one of the composite scaling factor 524, vehicle speed 504, a vehicle speed error 530, a hydraulic fluid pressure error 532, or the hydraulic fluid pressure 516. The pump displacement control logic 526 and motor displacement control logic 528 may represent operations performed by the controller 200 to control the pump displacement and motor displacement. For example, the controller 200 may be configured to calculate the vehicle speed error 530 by comparing (e.g., computing a difference between) the requested vehicle speed 502 and the monitored vehicle speed (illustrated by mathematical operator 536). The controller 200 may be configured to calculate the hydraulic fluid pressure error 532 by comparing (e.g., computing a difference between) the sensed hydraulic fluid pressure 516 and a predetermined target pressure value 538. Additionally, in some embodiments, the motor displacement control logic 528 may be configured to control the motor displacement based on the monitored hydraulic motor speed 514. For example, the controller 200 may be configured to monitor the hydraulic motor speed 514 (e.g., using the motor gearbox speed sensor 168 discussed above with reference to FIG. 2). In some embodiments, the controller 200 may be configured to reference a displacement limit look-up table 540, for example as explained in greater detail below with reference to FIGS. 8A-8C, to determine a maximum motor displacement 542.

In some embodiments, a control valve control logic 544 may be configured to generate a valve control signal 546 based on the monitored fluid temperature 512. For example, the control valve control logic 546 may be configured to compare the fluid temperature 512 with a predetermined temperature threshold. When the fluid temperature exceeds the temperature threshold, the controller 200 may be configured to open the control valve 122 (e.g., adjust the control valve 122 towards an open position) to increase the discharge flow from the closed hydraulic loop 110 such that the charge pump 102 provides an increased charge flow of cooling hydraulic fluid into the closed hydraulic loop 110 thereby reducing the hydraulic fluid temperature.

Thus, in some embodiments, the pump displacement control logic 526 may generate a pump control signal 548; the motor displacement control logic 528 may generate a motor control signal 550; and the control valve control logic 544 may generate the valve control signal 546. The controller 200 may control the operation of the hydraulic pump 102, hydraulic motor 108, and control valve 122 based on the pump control signal 548, motor control signal 550, and valve control signal 546, respectively. Feedback signals 552 may be received from the various sensors associated with the hydrostatic drive system 100 and decoded into the various operating parameters discussed above (e.g., vehicle speed 504, engine speed 506, hydraulic fluid temperature 512, etc.).

Generally, during operation of the hydrostatic system 100, the controller 200 will control the hydraulic pump displacement and motor pump displacement based on the vehicle speed error 530, among other parameters. For example, in some embodiments, when the vehicle speed error 530 is positive, indicating that the requested speed 502 is greater than the monitored vehicle speed 504, the controller 200 may increase the pump displacement and/or reduce the motor displacement. When the vehicle speed error 530 is negative, indicating that the requested speed 502 is less than the monitored vehicle speed 504, the controller 200 may decrease the pump displacement and/or increase the motor displacement to provide engine braking.

Figure 6A:
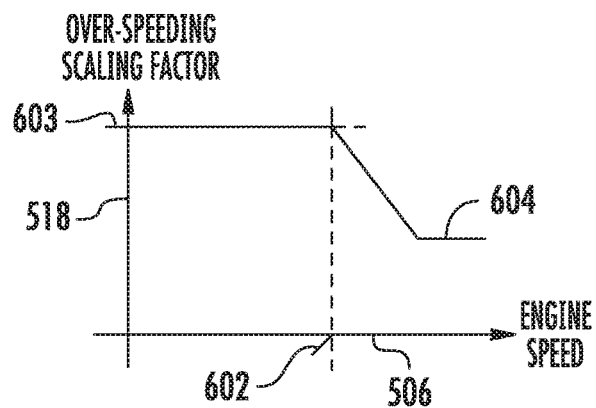
FIGS. 6A and 6B illustrate example relationships between various parameters used to control the operation of a hydrostatic drive system in accordance with aspects of the present disclosure.
Figure 6B:
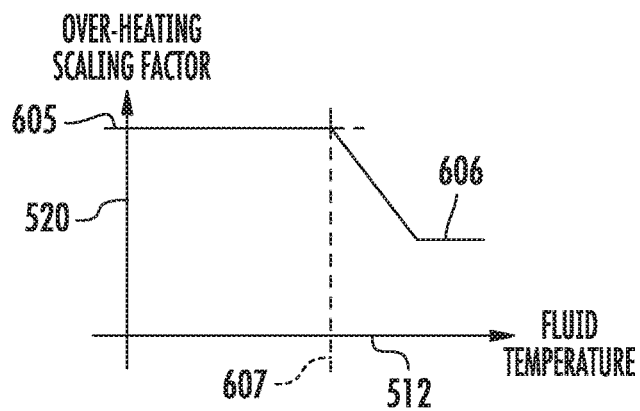

FIGS. 6A and 6B illustrate simplified, example relationships between various parameters that may be used by the controller 200 when implementing the pump displacement control logic 526 and the motor displacement control logic 528 in some embodiments. For example, FIG. 6A illustrates an example relationship between the over-speeding scaling factor 518 and the monitored engine speed 506. As indicated above, a decrease in the over-speeding scaling factor 518 may cause the system 500 to adjust operating parameters (e.g., the pump displacement and/or motor displacement) to prevent over-speeding of the engine 23. For example, the system 500 may decrease the amount of engine braking when the over-speeding scaling factor 518 decreases such that a smaller portion of the kinetic energy is dissipated through engine braking, thereby reducing the speed of the engine 23.

In some embodiments, for monitored engine speed values less than a predetermined engine speed threshold 602, the over-speeding scaling factor may equal a predetermined maximum over-speeding scaling factor value 603. For example, the predetermined maximum over-speeding scaling factor 603 value may equal one. As the monitored engine speed increases above the predetermined engine speed threshold 602, the over-speeding scaling factor 518 may decrease resulting in decreased engine braking being provided. For example, in one embodiment, the over-speeding scaling factor 518 may linearly decrease to a predetermined minimum over-speeding scaling factor value 604. In other embodiments, the relationship between the over-speeding scaling factor 518 and the monitored engine speed 506 may differ. For example, the over-speeding scaling factor 518 may non-linearly decrease (e.g., parabolically, asymptotically, etc.) to the predetermined minimum over-speeding scaling factor value 604. In other embodiments, the predetermined minimum over-speeding scaling factor value 604 may be zero such that the over-speeding scaling factor 518 decreases to zero at a predetermined maximum safe engine speed. In some embodiments, this may prevent any engine braking from being provided, for example, under conditions when doing so may damage the engine.

Referring to FIG. 6B, in some embodiments, the over-heating scaling factor 520 may similarly be determined based on a relationship between the over-heating scaling factor 520 and the monitored hydraulic fluid temperature 512. As indicated above, a decrease in the over-heating scaling factor 520 may cause the system 500 to adjust operating parameters (e.g., the pump displacement and/or motor displacement) to prevent overheating of the hydraulic fluid in the closed hydraulic loop 110. For example, the system 500 may increase the amount of engine braking when the over-heating scaling factor 520 decreases such that a greater portion of the kinetic energy is dissipated through engine braking, thereby reducing the portion that is converted into heat.

The over-heating scaling factor 520 may have be equal to a predetermined maximum over-heating scaling factor value 605 for hydraulic fluid temperatures 512 less than a predetermined fluid temperature threshold 607 (e.g., a maximum safe operating temperature). For example, the predetermined maximum over-heating scaling factor 605 value may equal one. In some embodiments, the over-heating scaling factor 520 may linearly decrease to a predetermined minimum over-heating scaling factor 606 as the hydraulic fluid temperature increases above the predetermined fluid temperature threshold 607. Such a decrease may cause the system 500 to adjust the pump displacement and/or motor displacement to prevent over-heating of the hydraulic fluid. In other embodiments, the over-heating scaling factor 520 may non-linearly decrease to the predetermined minimum over-heating scaling factor 606. In other embodiments, the over-heating scaling factor 520 may decrease to zero at a maximum safe fluid temperature to protect the hydrostatic drive system 100 from overheating.

Although the predetermined relationships discussed above are each illustrated with reference to single parameters (e.g., engine speed 506 in FIG. 6A and hydraulic fluid temperature 512 in FIG. 6B), it should be understood that the over-speeding scaling factor 518 and/or over-heating scaling factor 520 may also be based on additional parameters. For example, in some embodiments, the controller 200 may be configured to determine the over-speeding scaling factor 518 by referencing an over-speeding lookup table that correlates the over-speeding scaling factor 518 to at least one of a sensed engine speed 506, vehicle acceleration 508, or a sensed ground slope 510. Similarly, in some embodiments, the controller 200 may be configured to determine the over-heating scaling factor 520 by referencing an over-heating lookup table that correlates the over-heating scaling factor 520 to at least one of the monitored fluid temperature 512, the vehicle acceleration 508, or the sensed ground slope 510.

Figure 7:
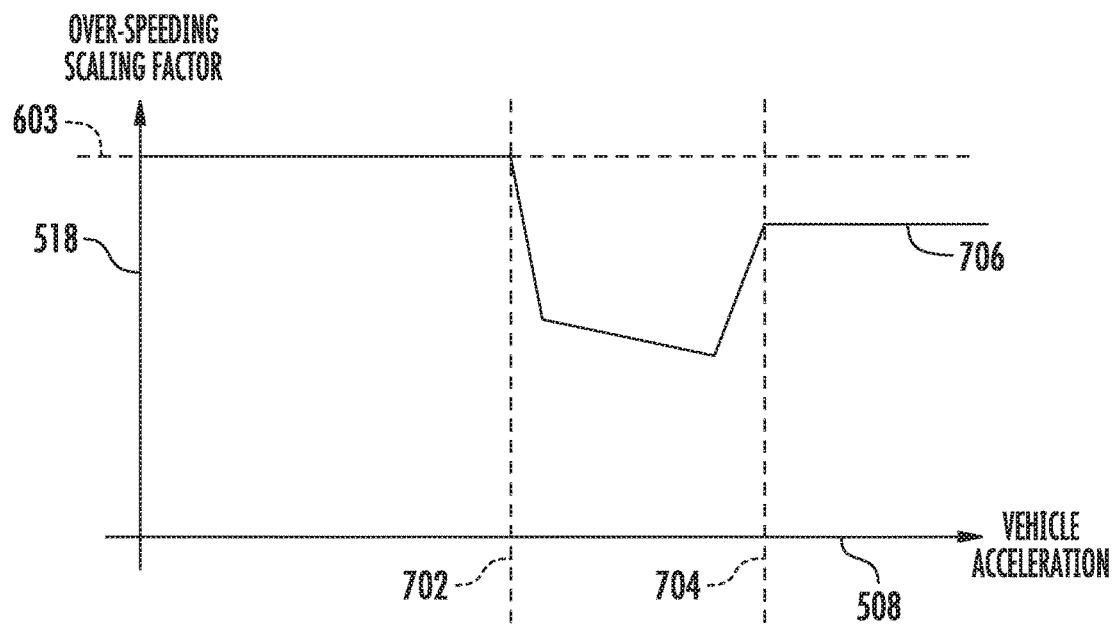
FIG. 7 illustrates an example relationship between an over-speeding scaling factor and a vehicle acceleration parameter used to control the operation of a hydrostatic drive system in accordance with aspects of the present disclosure.

For example, referring to FIG. 7, in some embodiments, the over-speeding scaling factor 518 may also be determined based on a relationship with the vehicle acceleration 508. Specifically, FIG. 7 illustrates an example relationship between the over-speeding scaling factor 518 and the vehicle acceleration 508 for a ground slope 510 of zero (i.e., level ground) and an engine speed 506 greater than the engine speed threshold 602. For vehicle acceleration values less than a first threshold 702 (e.g., low decelerations), the over-speeding scaling factor 518 may equal the predetermined maximum over-speeding scaling factor value 603. For such vehicle acceleration values, there may be no need for over-speeding protection because insufficient energy may be directed to the engine 23 to cause the engine 23 to exceed a safe operating engine speed.

For vehicle acceleration values greater than the first threshold 702 but less than a second threshold 704 (e.g., medium decelerations), the over-speeding scaling factor may be less than the predetermined maximum over-speeding scaling factor value 603. More specifically, for vehicle acceleration values between the first threshold 702 and the second threshold 704, the over-speeding scaling factor 518 may generally have a 'U'-shaped profile. For such vehicle acceleration values (e.g., medium decelerations), the pressure relief valve(s) may not be open (e.g., pressure relief valves 146, 150 discussed above with reference to FIG. 2). As indicated above, the pressure relief valve(s) 146, 150 may be configured to divert hydraulic fluid (e.g., to the reservoir 120) when the hydraulic fluid pressure 516 exceeds the respective relief valve pressure threshold(s). Thus, for such decelerations, a greater portion of the kinetic energy of the work vehicle 10 may be directed into the engine 23 to provide engine braking. As such, the over-speeding scaling factor 518 may be reduced to protect the engine speed 506 from exceeding a safe operating limit.

At the second threshold 704, the over-speeding scaling factor 518 may be equal to a constant value 706, which, in some embodiments, may be less than the predetermined maximum over-speeding scaling factor value 603 and greater than a minimum value between the first threshold 702 and second threshold 704. For vehicle acceleration values greater than the second threshold 704 (e.g., high decelerations), the over-speeding scaling factor 518 may equal the constant value 706. For such vehicle acceleration values, the hydraulic fluid pressure 516 may be great enough to open the pressure relief valves 146, 150, which may increase the proportion of the kinetic energy of the work vehicle 10 that is converted into friction heat and reduce the proportion that is directed to the engine 23 to provide engine braking. Thus, for such vehicle acceleration values, the over-speeding scaling factor 518 may be less than one.

Figure 8A:
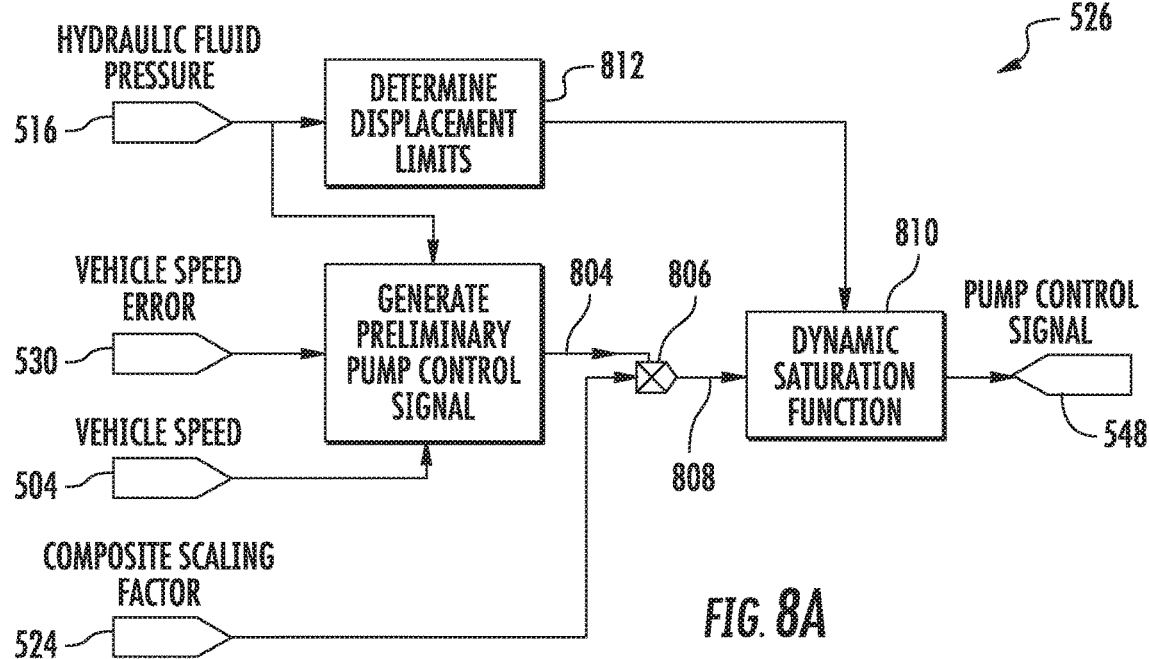
FIG. 8A illustrates an example embodiment of a pump displacement control logic portion of the system illustrated in FIG. 5 in accordance with aspects of the present disclosure.

FIG. 8A illustrates an example embodiment of the pump displacement control logic 526 discussed above with reference to FIG. 5. The pump displacement control logic 526 may output the pump control signal 548 based on one or more input operating parameters of the hydrostatic drive system 100. In some embodiments, the input operating parameters may include the vehicle speed error 530, hydraulic fluid pressure 516, the vehicle speed 504, and/or the composite scaling factor 524. The controller 200 may be configured to generate, at (802), a preliminary pump control signal 804 based on the vehicle speed error 530, vehicle speed 504, and/or hydraulic pressure 516. The controller 200 may be configured to scale, at (806), the preliminary pump control signal 804 by the composite scaling factor 524 to generate a scaled preliminary pump control signal 808. For example, the composite scaling factor 808 may range from zero to one. Scaling the preliminary pump control signal 804 by the composite scaling factor 524 may include multiplying the preliminary pump control signal 804 by the composite scaling factor 524. Thus, in some embodiments, the pump control signal 548 may be less than or equal to the preliminary pump control signal 804. Scaling the preliminary pump control signal may help protect against overheating the hydraulic fluid or operating the engine 23 at an unsafe engine speed.

In some embodiments, the controller 200 may be configured to apply a dynamic saturation function 810 to the scaled preliminary pump control signal 808. The controller 200 may be configured to determine, at (812), an upper pump displacement limit and/or a lower pump displacement limit based on the hydraulic fluid pressure. The controller 200 may decrease the upper pump displacement limit and/or increase the lower pump displacement limit in response to an increase in the hydraulic fluid pressure 516, for example as explained in greater detail below.

Figure 8B:
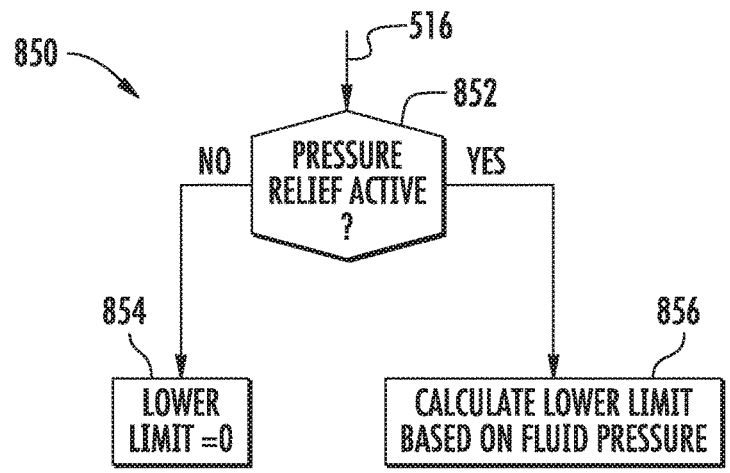
FIG. 8B illustrates an exemplary algorithm for determining a lower pump displacement limit value during a braking operation according to aspects of the present disclosure.

FIG. 8B illustrates an exemplary algorithm 850 for determining the lower pump displacement limit values during a braking operation according to aspects of the present disclosure. At (852), the controller 200 may determine if at least one pressure relief valve (e.g., the first pressure relief valve 146 or second pressure relief valve 150 described above with reference to FIG. 5) is open/active. For example, the controller 200 may compare the hydraulic fluid pressure 516 with the first and/or second relief valve pressure threshold(s) associated with the first pressure relief valve and/or second pressure relief valve 146, 150. In some embodiments, the hydrostatic drive system 100 may also include additional pressure sensors (e.g., configured to sense a hydraulic pressure in the charge supply line 130) such that the pressure difference across the relief valves 146, 150 may be calculated. In other embodiments, one or more flow sensors may be configured to directly measure flow rate(s) through the relief valves 146, 150.

If the controller 200 determines that the pressure relief valves 146, 150 are not open, at (854), the controller 200 may set the lower pump displacement limit to zero (e.g., allow the pump displacement to decrease to zero). If the controller 200 determines that the pressure relief valves 146, 150 are open, at (856), the controller 200 may determine (e.g., calculate) the lower pump displacement limit based, at least in part, on the hydraulic fluid pressure 516, for example as explained in greater detail with reference to FIG. 8C.

Figure 8C:
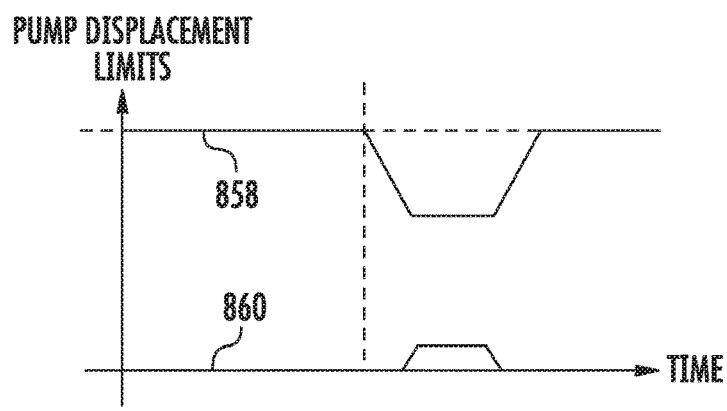
FIG. 8C illustrates an example plot of a hydraulic pump displacement limit according to aspects of the present disclosure.

FIG. 8C illustrates an example plot of the hydraulic pump displacement limits over time according to aspects of the present disclosure. For example, as indicated above, in some embodiments, the controller 200 may decrease an upper pump displacement limit 858 and/or increase the lower pump displacement 860 limit in response to an increase in the hydraulic fluid pressure 516, for example, as caused by a braking operation. This may help ensure that the engine 23 provides at least a minimal amount of engine braking during the braking operation. Additionally, in some embodiments, the upper pump displacement limit 858 may be adjusted (e.g., decreased) during a braking operation. For example, the upper pump displacement limit 858 may be calculated based on the hydraulic pressure 516 measured in the closed hydraulic loop 110 and a maximum engine frictional torque threshold. For example, the upper pump displacement limit 858 may be calculated based on the maximum engine frictional torque threshold, a pump gear ratio associated with the engine gearbox 106, a maximum pump volume (e.g., corresponding to a maximum possible hydraulic pump displacement), and/or the hydraulic pressure 516 measured in the closed hydraulic loop 110. For example, in one embodiment, the upper pump displacement 858 limit may be calculated according to the following equation:

$$\text{Upper Pump Displacement Limit} = \frac{\text{Max. Enging Torque} \times \text{Pump Gear Ratio}}{\text{Max. Pump Displacement} \times \text{Hydraulic Pressure}}$$

In some embodiments, the maximum engine frictional torque threshold may be based on safety limits provided by a manufacturer of the pump, for example. The upper pump displacement limit 858 may provide an additional safety feature to prevent the engine speed 506 from exceeding a maximum safe speed.

Figure 9A:
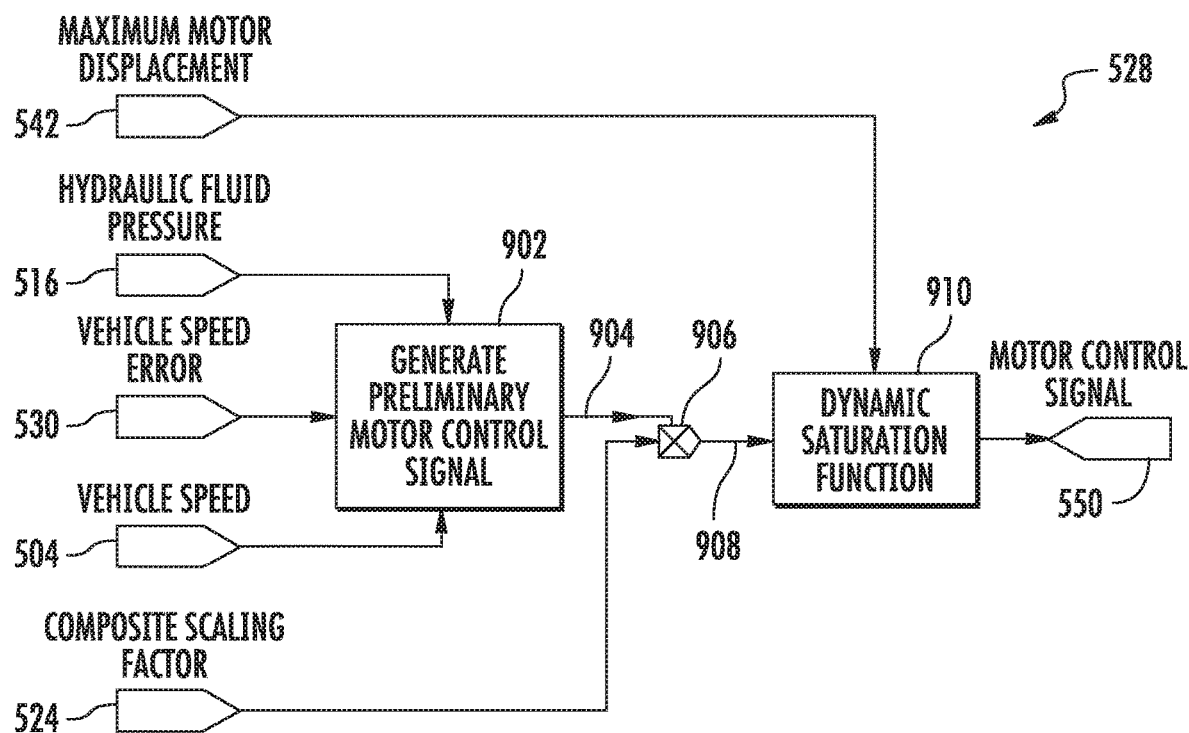
FIG. 9A illustrates an example embodiment of a motor displacement control logic portion of the system illustrated in FIG. 5 in accordance with aspects of the present disclosure.

FIG. 9A illustrates an example embodiment of the motor displacement control logic 528 discussed above with reference to FIG. 5. In some embodiments, the motor displacement control logic 528 may be configured in a similar manner to the pump displacement control logic 526. However, the motor displacement control logic 528 may not include upper or lower limit calculations. The motor displacement control logic 528 may be configured to generate the motor control signal 550 based on the maximum motor displacement 542, the hydraulic fluid pressure 516, vehicle speed error 530, vehicle speed 504, and/or composite scaling factor 524.

In some embodiments, the controller 200 may be configured to generate, at (902), a preliminary motor control signal 904 based on the hydraulic fluid pressure 516, vehicle speed error 530, vehicle speed 504, and/or composite scaling factor 524. The controller 200 may be configured to scale, at (906), the preliminary motor control signal 904 by the composite scaling factor 524 to generate the scaled preliminary motor control signal 908. For example, the composite scaling factor 908 may range from zero to one. Scaling the preliminary motor control signal 904 by the composite scaling factor 524 may include multiplying the preliminary motor control signal 904 by the composite scaling factor 524. Thus, the motor control signal 550 may be less than or equal to the preliminary motor control signal 904. Scaling the preliminary motor control signal 904 may help protect against overheating the hydraulic fluid or operating the engine 23 at an unsafe engine speed. In some embodiments, the controller 200 may be configured to apply a dynamic saturation function 910 to the scaled preliminary pump control signal 908 based on the maximum displacement 542. For example, the dynamic saturation function 910 may prevent the motor control signal from exceeding the maximum displacement 542.

Figure 9B:
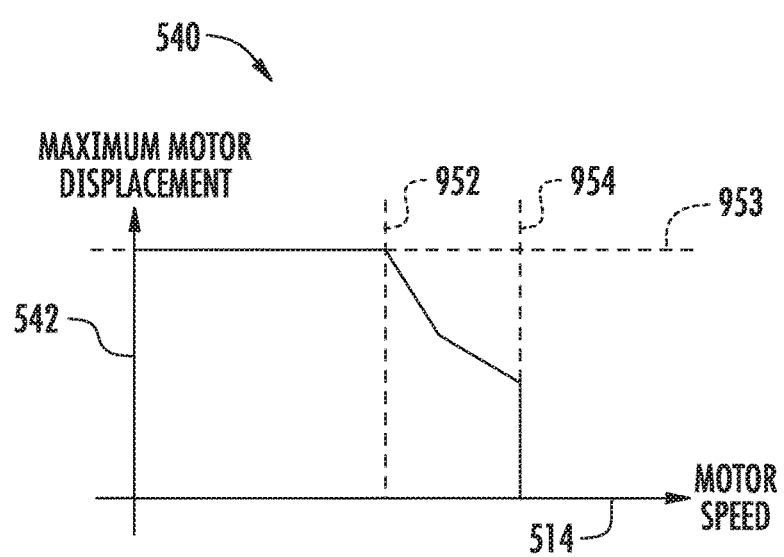
FIG. 9B illustrates an example embodiment of a displacement limit look-up table of the system illustrated in FIG. 5 in accordance with aspects of the present disclosure.

FIG. 9B illustrates an example displacement limit look-up table 540, for example, as discussed above with reference to FIG. 5. The displacement limit look-up table 540 may correlate the maximum motor displacement 542 and the hydraulic motor speed 514 according to aspects of the present disclosure. For example, the controller 200 may reference the look-up table 540 to determine the maximum hydraulic motor displacement 542 that can safely be used based on the motor speed 514. For example, when the hydraulic motor speed 514 is less than a first motor speed threshold 952, the maximum motor displacement 542 may equal a predetermined maximum motor displacement value 953. As the hydraulic motor speed 514 increases beyond the first motor speed threshold 952, the maximum motor displacement 542 may decrease until the hydraulic motor speed 514 equals a second motor speed threshold 954.

In some embodiments, when the hydraulic motor speed 514 is greater than the second motor speed threshold 954, the maximum motor displacement 542 may equal a predetermined displacement value (e.g., about zero), which may be selected to cause the hydraulic motor displacement 550 to be reduced to a safe level, thus protecting the hydraulic motor 114 from damage. The second motor speed threshold 954 and/or predetermined displacement value (illustrated as about zero) may be provided by the manufacturer of the hydraulic motor 114, for example. In other embodiments, when a hydraulic motor speed 514 is detected that is greater than the second motor speed threshold 954, the maximum motor displacement 542 may be dynamically controlled with the goal of maintaining the hydraulic motor speed 514 at a value less than the second motor speed threshold 954.

Figure 10:
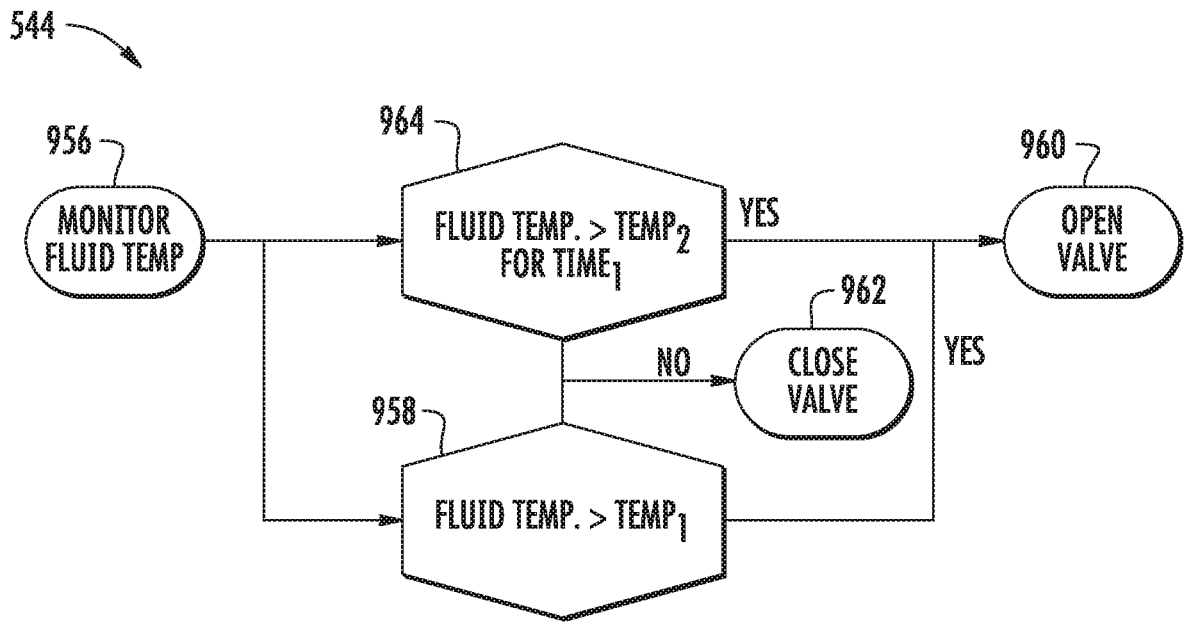
FIG. 10 illustrates an example embodiment of a portion of the schematic view of the system shown in FIG. 5 in accordance with aspects of the present disclosure.

FIG. 10 illustrates an example embodiment of the control valve control logic 544 discussed above with reference to FIG. 5. For example, in some embodiments, the control valve control logic 544 may, at (956), monitor the fluid temperature 512 of the hydraulic fluid supplied between the hydraulic motor 114 and the hydraulic pump 102 (e.g., using the temperature sensor 162). The control valve control logic 544 may include, at (958), comparing the monitored fluid temperature 512 with a first predetermined temperature threshold (represented by "TEMP$_1$" in FIG. 10). When the fluid temperature exceeds the first temperature threshold, the control valve control logic 544 may open the control valve 122 (e.g., adjust the control valve 122 towards an open position). As a result, the charge pump 128 may provide an increased charge flow of relatively cooler hydraulic fluid from the reservoir 120 into the closed hydraulic loop 10, thereby reducing the temperature of the hydraulic fluid. In alternative embodiments, the controller 200 may directly control the operation of the charge pump 128 to selectively increase the charge flow into the closed hydraulic loop 110.

In some embodiments, when the fluid temperature does not exceed the first temperature threshold, the control valve control logic may, at (962), adjust the control valve 122 to reduce the charge flow of the cooling hydraulic fluid into the closed hydraulic loop 110. For example, the control valve control logic 544 may close the control valve 122 (e.g., adjust the control valve 122 towards a closed position) to reduce the discharge flow.

In some embodiments, the control valve control logic 544 may, at (964), compare the monitored fluid temperature 512 with a second predetermined temperature threshold (represented by "TEMP$_2$" in FIG. 10). The second predetermined temperature threshold may be greater than the first predetermined temperature threshold discussed above. When the fluid temperature exceeds the second temperature threshold for at least a predetermined time period (represented by "TIME$_1$" in FIG. 10), the control valve control logic 544 may, at (960), automatically open the control valve to increase the discharge flow, and, as a result, the charge pump 128 may increase the charge flow of relatively cooler hydraulic fluid from the reservoir 120 into the closed hydraulic loop 10 thereby reducing the temperature of the hydraulic fluid.

In some embodiments, the controller 200 may be configured to control the pump displacement and motor displacement according to a different set of rules and/or using a different algorithm when at least one pressure relief valve 146, 150 is open. As indicated above, the hydrostatic drive system 100 may provide engine braking. For example, when the requested speed 502 is less than the monitored vehicle speed 504 (causing the vehicle speed error 530 to be negative), the controller 200 may decrease the pump displacement and/or increase the motor displacement to provide engine braking. This may cause the hydraulic fluid pressure 516 to increase and exceed the first predetermined relief valve pressure, causing the first pressure relief valve 146 to open. Similarly, the increase in the hydraulic fluid pressure 516 may cause the second pressure relief valve 150 to open. In some embodiments, the pressure relief valves 146, 150, however, may not sufficiently reduce the hydraulic fluid pressure 516. This may occur when the requested deceleration is greater than the amount of engine braking the hydrostatic drive system 100 can safely provide, for example. In such a situation, the controller 200 may be configured to aim to reduce the hydraulic pressure 516 to the first predetermined relief valve pressure or second predetermined relief valve pressure. For example, the controller 200 may control the hydraulic pump displacement and/or hydraulic motor displacement based on an integral signal of vehicle speed error 530.

Figure 11:
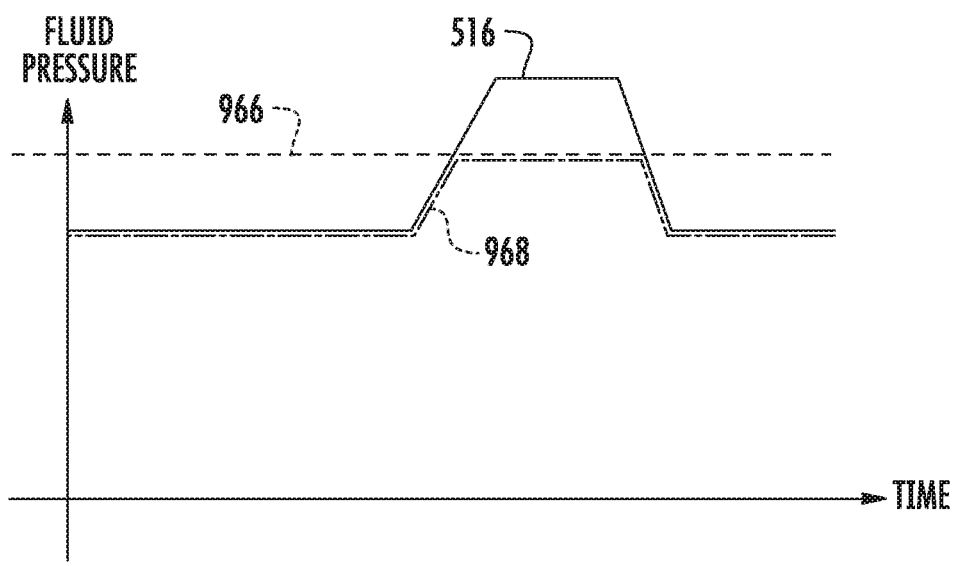
FIG. 11 illustrates a sample time-varying chart of hydraulic fluid pressure during a braking event according to aspects of the present disclosure.

For example, FIG. 11 illustrates a time-varying chart of hydraulic fluid pressure during a simplified, example braking event according to aspects of the present disclosure. When the hydraulic fluid pressure 516 is less than the relief valve pressure (illustrated by the horizontal dotted line 966), the controller 200 may aim to regulate the hydraulic fluid pressure 516 to be a target pressure (illustrated by dotted-dashed line 1104) calculated based on the vehicle speed error 530 and/or the amount of requested deceleration calculated based on the vehicle speed error 530. For example, when the hydraulic fluid pressure 516 is less than the relief valve pressure 1102, the hydraulic fluid pressure 516 and target pressure 968 are approximately equal because the hydrostatic drive system 100 can successfully regulate the hydraulic fluid pressure 516. When the hydraulic fluid pressure 516 is greater than the relief valve pressure 1104, however, the controller 200 may not be able to reduce the hydraulic fluid pressure 516 below the relief valve pressure 1104. Thus, instead, the controller 200 may aim to regulate the hydraulic fluid pressure 516 to equal the relief valve pressure 1102. In other words, when the hydraulic fluid pressure 516 is greater than the relief valve pressure 966, the target pressure 1104 may approximately equal the relief valve pressure 966.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for braking a work vehicle comprising an engine and a hydrostatic drive system, the hydrostatic drive system comprising a hydraulic pump configured to be rotationally driven by the engine and a hydraulic motor fluidly coupled with the hydraulic pump through a closed hydraulic loop of the hydrostatic drive system, the hydraulic pump configured to fluidly drive the hydraulic motor, the method comprising:
    receiving, with one or more computing devices, an operator request to reduce a ground speed of the work vehicle;
    monitoring, with the one or more computing devices, a fluid temperature of a hydraulic fluid associated with the closed hydraulic loop; and
    automatically controlling, with the one or more computing devices, at least one of a pump displacement of the hydraulic pump or a motor displacement of the hydraulic motor based at least in part on the monitored fluid temperature to adjust hydrostatic braking of the work vehicle and thereby reduce the ground speed of the work vehicle.

2. The method of claim 1, farther comprising:
    determining an engine speed of the engine;
    comparing the engine speed with a predetermined engine speed threshold; and
    when the engine speed threshold exceeds the predetermined engine speed threshold, adjusting at least one of the pump displacement or the motor displacement.

3. The method of claim 1, wherein automatically controlling the at least one of the pump displacement or the motor displacement comprises:
    determining at least one of an engine speed of the engine or an acceleration of the work vehicle;
    determining an over-speeding scaling factor based at least in part on the at least one of the engine speed of the engine or the acceleration of the work vehicle; and
    controlling the at least one of the pump displacement or the motor displacement based at least in part on the monitored fluid temperature and the over-speeding scaling factor.

4. The method of claim 1; further comprising:
    determining an upper pump displacement limit and a lower pump displacement limit;

wherein automatically controlling at least one of the pump displacement of the hydraulic pump or the motor displacement of the hydraulic motor comprises adjusting the pump displacement between the upper pump displacement limit and the lower pump displacement limit.

5. The method of claim 1, wherein automatically controlling the at least one of the pump displacement or the motor displacement comprises:
   determining an over-heating scaling factor based at least in part on the monitored fluid temperature; and
   controlling the at least one of the pump displacement or the motor displacement based at least in part on the over-heating scaling factor.

6. The method of claim 1, wherein automatically controlling the at least one of the pump displacement or the motor displacement comprises:
   determining an over-speeding scaling factor based on at least one of an engine speed of the engine or an acceleration of the work vehicle; and
   determining an over-heating scaling factor based on the monitored fluid temperature;
   determining a composite scaling feature based at least in part on over-speeding scaling factor and the over-heating scaling factor; and
   controlling the at least one of the pump displacement or the motor displacement based at least in part on the composite scaling factor.

7. The method of claim 1, further comprising:
   monitoring a motor speed of the hydraulic motor; and
   adjusting the motor displacement based on the monitored motor speed.

8. The method of claim 1, further comprising:
   monitoring a hydraulic fluid pressure associated with the closed hydraulic loop;
   determining whether the hydraulic fluid pressure is greater than a predetermined relief valve pressure; and
   when it is determined that the hydraulic fluid pressure is greater than the predetermined relief valve pressure, adjusting the pump displacement between an upper limit and a lower limit, the lower limit being greater than a zero displacement position.

9. The method of claim 1, further comprising automatically adjusting a control valve to adjust a discharge flow of hydraulic fluid out of the closed hydraulic loop based on the monitored fluid temperature.

10. The method of claim 9, further comprising automatically adjusting a charge flow of hydraulic fluid into the closed hydraulic loop to replenish the closed hydraulic loop.

11. A work vehicle, comprising:
   an engine;
   a hydrostatic drive system including a hydraulic pump configured to be rotationally driven by the engine and a hydraulic motor fluidly coupled with the hydraulic pump through a closed hydraulic loop of the hydrostatic drive system, the hydraulic pump configured to fluidly drive the hydraulic motor;
   a controller configured to control an operation of the hydrostatic chive system, the controller being configured to:
      monitor a fluid temperature of a hydraulic fluid associated with the closed hydraulic loop; and
      automatically control at least one of a pump displacement of the hydraulic pump or a motor displacement of the hydraulic motor based at least in part on the monitored fluid temperature to adjust an amount of hydrostatic braking of the work vehicle.

12. The work vehicle of claim 11, wherein the controller is configured to determine an engine speed of the engine and compare the engine speed with a predetermined engine speed threshold, the controller being configured to adjust at least one of the pump displacement or the motor displacement when the engine speed threshold exceeds the predetermined engine speed threshold.

13. The work vehicle of claim 11, wherein the controller is configured to determine at least one of an engine speed of the engine or an acceleration of the work vehicle and determining an over-speeding scaling factor based at least in part on the at least one of the engine speed of the engine or the acceleration of the work vehicle, the controller being configured to control the at least one of the pump displacement or the motor displacement based at least in part on the monitored fluid temperature and the over-speeding scaling factor.

14. The work vehicle of claim 11, wherein the controller is configured to determine an upper pump displacement limit and a lower pump displacement limit, the controller being configured to adjust the pump displacement between the upper pump displacement limit and the lower pump displacement limit.

15. The work vehicle of claim 11, wherein the controller is configured to determine an over-heating scaling factor based at least in part on the monitored fluid temperature, the controller being configured to control the at least one of the pump displacement or the motor displacement based at least in part on the over-heating scaling factor.

16. The work vehicle of claim 11, wherein the controller is configured to determine an over-speeding scaling factor based on at least one of an engine speed of the engine or an acceleration of the work vehicle, and determine an over-heating scaling factor based on the monitored fluid temperature, the controller being further configured to determine a composite scaling feature based at least in part on over-speeding scaling factor and the over-heating scaling factor, and control the at least one of the pump displacement or the motor displacement based at least in part on the composite scaling factor.

17. The work vehicle of claim 11, wherein the controller is further configured to monitor a motor speed of the hydraulic motor, and adjust the motor displacement based on the monitored motor speed.

18. The work vehicle of claim 11, wherein the controller is configured to monitor a hydraulic fluid pressure associated with the closed hydraulic loop and determine whether the hydraulic fluid pressure is greater than a predetermined relief valve pressure, wherein, when it is determined that the hydraulic fluid pressure is greater than the predetermined relief valve pressure, the controller is configured to adjust the pump displacement between an upper limit and a lower limit, the lower limit being greater than a zero displacement position.

19. The work vehicle of claim 11, further comprising a control valve configured to control a discharge flow of hydraulic fluid out of the closed hydraulic loop, the controller being configured to automatically control an operation of the control valve to adjust the discharge flow based on the monitored fluid temperature.

20. The work vehicle of claim 19, further comprising a charge pump configured to provide a charge flow of hydraulic fluid into the closed hydraulic loop, the controller being configured to automatically control an operation of the charge pump to regulate the charge flow in order to replenish the closed hydraulic loop.

* * * * *